United States Patent [19]

Tsumura

[11] 4,084,241
[45] Apr. 11, 1978

[54] SYSTEM FOR PROCESSING MOVEMENT INFORMATION OF VEHICLE

[76] Inventor: Toshihiro Tsumura, 3-41, Abiko-cho, Sumiyoshi-ku, Osaka-shi, Japan

[21] Appl. No.: 760,588

[22] Filed: Jan. 19, 1977

Related U.S. Application Data

[63] Continuation-in-part of Ser. No. 621,113, Oct. 9, 1975, abandoned.

[30] Foreign Application Priority Data

| Oct. 19, 1974 | Japan | 49-120559 |
| Nov. 6, 1974 | Japan | 49-128480 |
| Feb. 22, 1975 | Japan | 50-22164 |
| Jun. 3, 1975 | Japan | 50-67319 |
| Jun. 24, 1975 | Japan | 50-78981 |
| Aug. 9, 1975 | Japan | 50-96889 |

[51] Int. Cl.² .............................................. G06F 15/50
[52] U.S. Cl. ...................................... 364/460; 340/24;
343/112 PT; 364/450; 364/462
[58] Field of Search ........... 235/150.2, 150.24, 150.26, 235/150.27; 340/24; 343/112 PT

[56] References Cited

U.S. PATENT DOCUMENTS

| 3,364,343 | 1/1968 | Hunt | 235/150.26 X |
| 3,392,448 | 7/1968 | Rock | 343/112 PT X |
| 3,538,313 | 11/1970 | Thomas et al. | 235/150.27 |
| 3,681,752 | 8/1972 | Cuddihy | 340/24 |
| 3,715,572 | 2/1973 | Bennett | 235/150.2 |
| 3,749,893 | 7/1973 | Hileman | 235/150.27 |
| 3,789,198 | 1/1974 | Henson et al. | 235/150.27 |

Primary Examiner—Jerry Smith
Attorney, Agent, or Firm—Birch, Stewart, Kolasch & Birch

[57] ABSTRACT

A system for generating the data concerning the position of a moving vehicle comprising paired independently rotatable wheels provided at the opposite sides of the moving direction of the vehicle, the system comprising first and second pulse generators independently and operatively coupled to the respective wheels for generating digital signals associated with the rotation speed of the respective wheels, a distance measuring device responsive to the outputs from said first and second digital signal generators for evaluating the moving distance of the vehicle, a direction storing device responsive to the outputs from said first and second digital signal generators for evaluating the moving direction of the vehicle, and a position determining device responsive to the moving distance and moving direction determinations for evaluating the moving position information of the vehicle. Such moving position information of the vehicle may be recorded on a map to trace the moving path of the vehicle on the map or, alternatively be displayed otherwise.

47 Claims, 33 Drawing Figures (a) OUTPUT OF 103 (203)
(b) OUTPUT OF 104 (204)
(c) OUTPUT OF 106 (206)

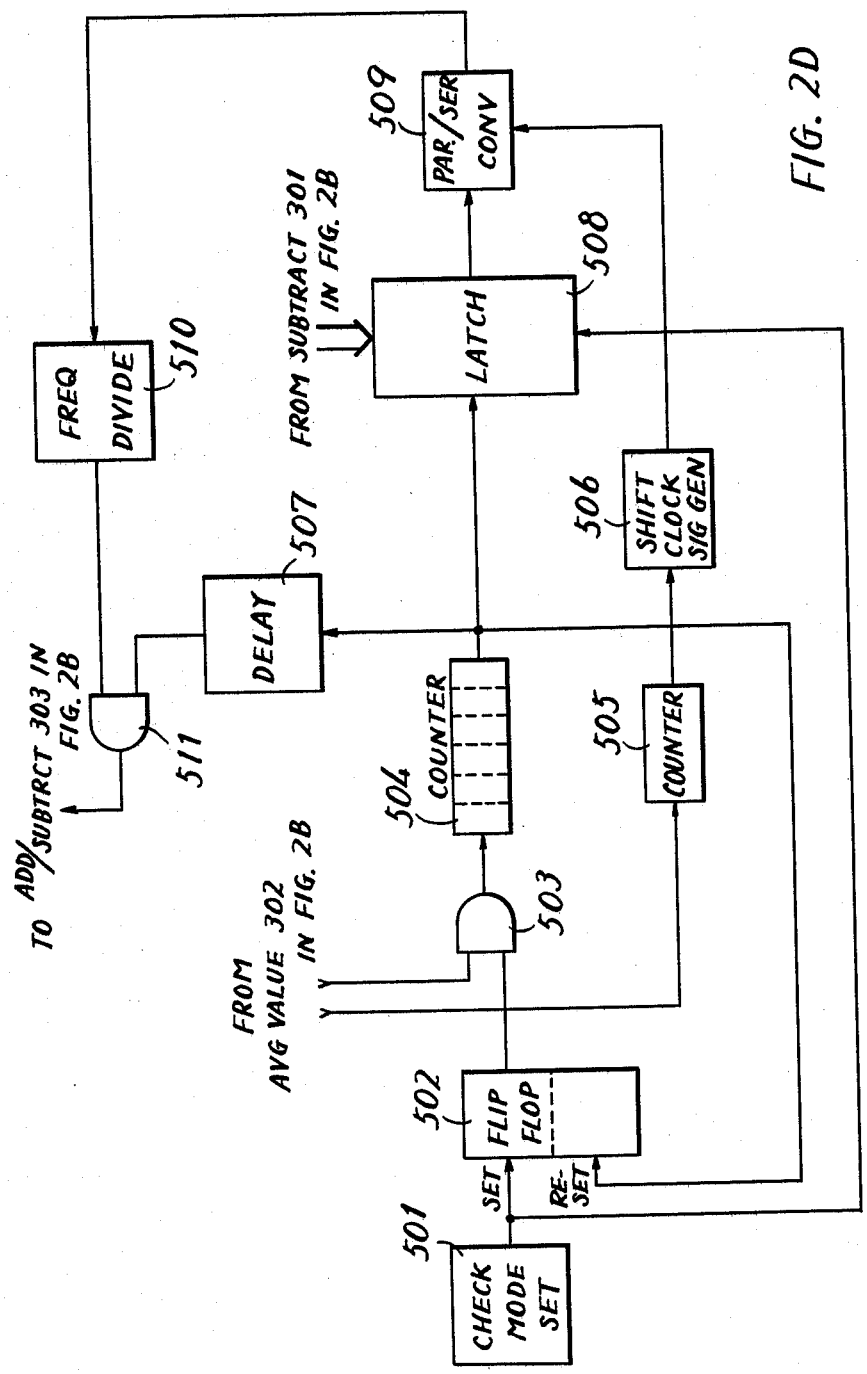

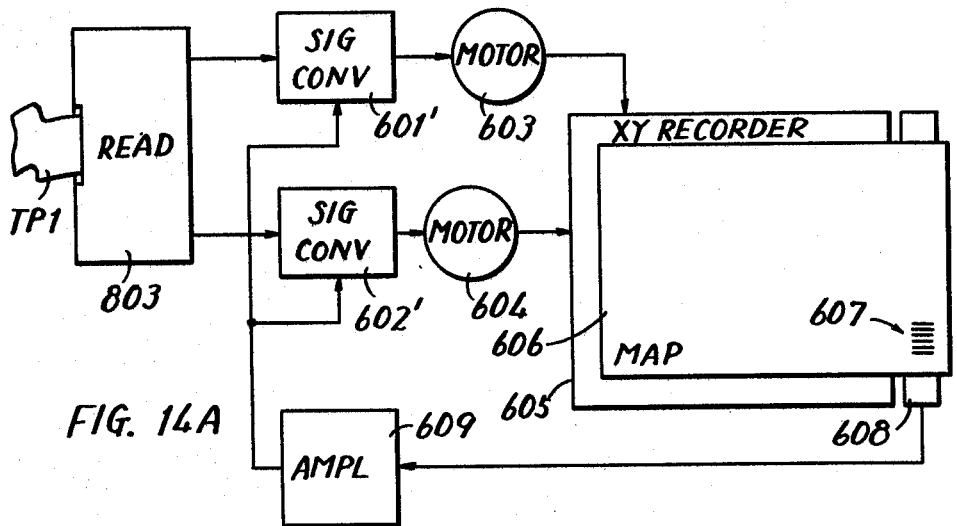
FIG. 14A
FIG. 15A
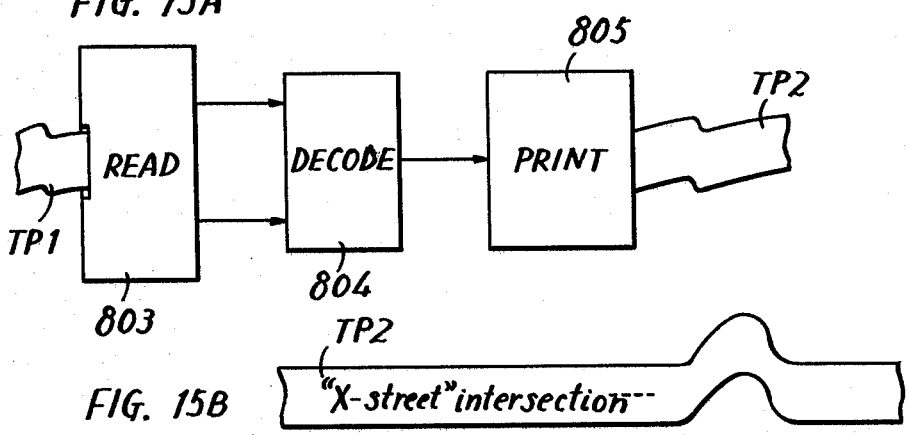
FIG. 15B
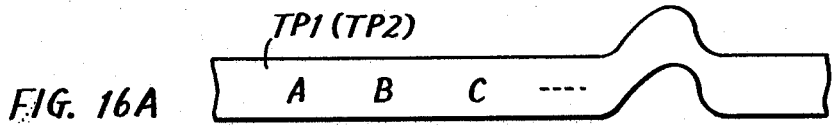
FIG. 16A
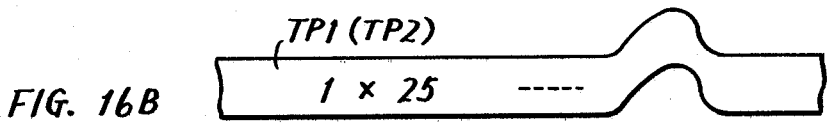
FIG. 16B

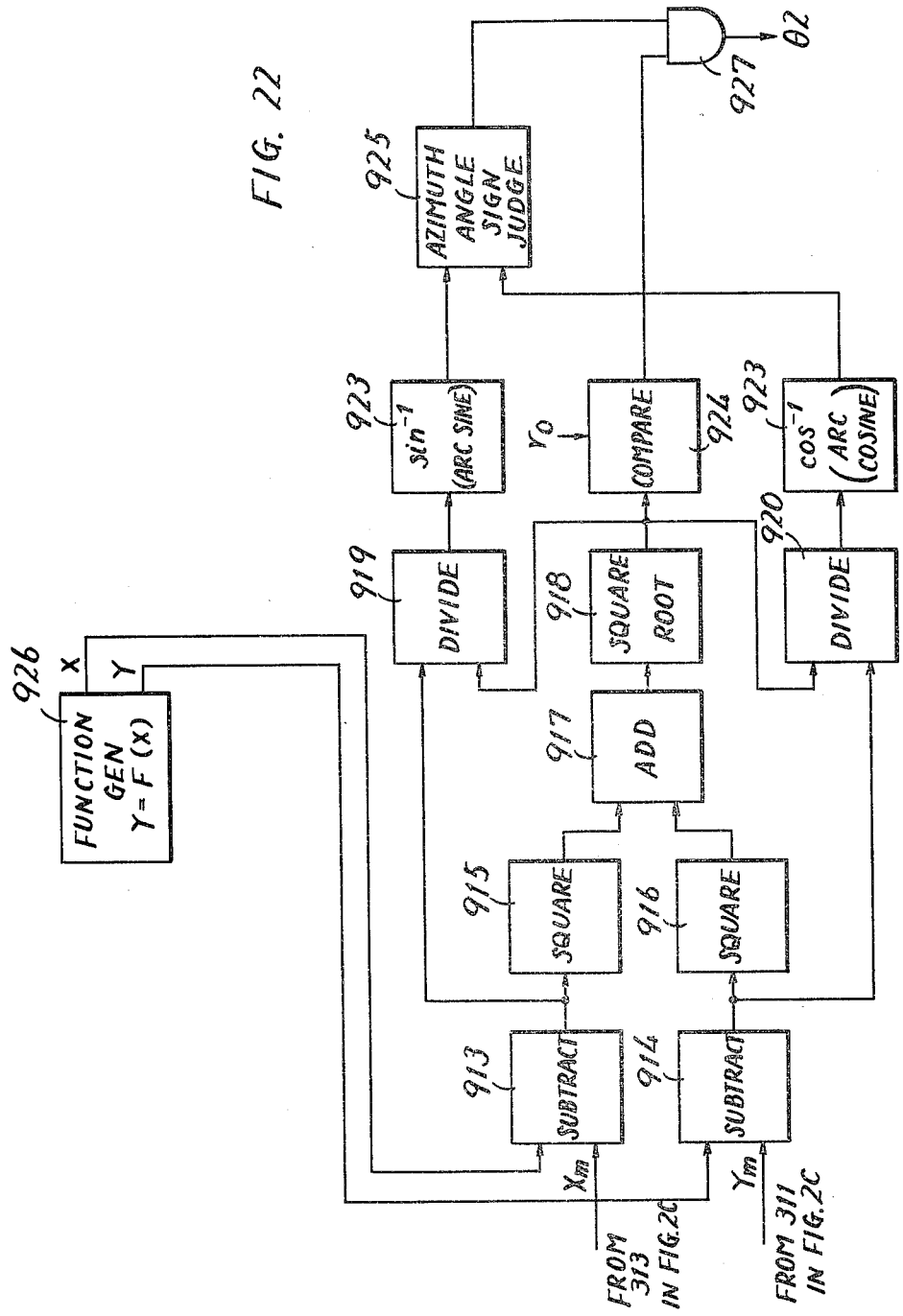

4,084,241

SYSTEM FOR PROCESSING MOVEMENT INFORMATION OF VEHICLE

This application is a continuation-in-part of copending application Ser. No. 621,113, filed Oct. 9, 1975 of Toshihiro Tsumura for SYSTEM FOR PROCESSING MOVEMENT INFORMATION OF VEHICLE and now abandoned.

BACKGROUND OF THE INVENTION

1. Field of the Invention

The present invention relates to a system for processing movement information of a vehicle. More specifically, the present invention relates to a system for processing information of the movement of a vehicle obtainable in association with the rotation of paired wheels provided on the vehicle for the purpose of detecting the position of the vehicle.

2. Description of the Prior Art

Most vehicles running on the ground comprise paired wheels provided on the left and right sides of the moving direction of the vehicle. One type of such vehicles is adapted to run on the railway provided in advance along a predetermined moving path of the vehicle. In view of the fact that a railway is provided in advance along a predetermined path of the vehicle, the position of the vehicle moving along the railway can be readily known as an integral function of the speed thereof with respect to the time. Another type of vehicle comprises paired independently rotatable wheels and can be steered as a function of the difference in rotation of the respective wheels. Typical examples of such vehicles are automobiles, airplanes, and the like. An essential feature of this type of vehicle is that the vehicle can be steered in any direction in any speed as desired. For this reason, however, it is difficult to detect the position of the moving vehicle from time to time. In fact, various navigational systems have been fully developed to locate the position of the moving vehicle from time to time by the vehicle itself. However, to be effective, such navigational systems should be employed on a world wide basis or on a nation wide basis, and even if this were the case, the cost of equipment on board the vehicle is too high. Thus, there is a need for an inexpensive and accurate system for locating the position of a moving vehicle by means of equipment borne on the vehicle itself.

Assuming that such equipment could be implemented, preferably the equipment can be compensated for or corrected for errors of the data concerning the position of the moving vehicle generated by the equipment, in accordance with correction data provided externally thereof, thereby to enhance the accuracy of the equipment. The present invention was thus achieved.

SUMMARY OF THE INVENTION

Briefly stated, the present invention comprises a system for generating data concerning the position of a moving vehicle comprising paired independently rotatable wheels provided at the opposite sides of the moving direction of the vehicle, said system comprising first and second pulse generating means independently and operatively coupled to the respective wheels for generating digital signals associated with the rotational speed of the respective wheels, means responsive to the outputs from said first and second digital signal generating means for evaluating the moving distance of the vehicle, means responsive to the outputs from said first and second digital signal generating means for evaluating the moving direction of said vehicle and means responsive to said moving distance and moving direction for evaluating the moving position information of the vehicle. Such moving position information of the vehicle may be recorded on a map to trace the moving path of the vehicle on the map or, alternatively, displayed otherwise.

In a preferred embodiment of the present invention, means is provided at a specified point for transmitting position information for identifying the position of the specified point, and the vehicle comprises means for receiving the transmitted position information for correcting the data generated in the vehicle in response to said position information for identifying the specified point if and when the vehicle passes said specified point, thereby to keep accurate the data generated by the vehicle.

Therefore, a principal object of the present invention is to provide a new system for locating the position of a moving vehicle in accordance with the data generated by the moving vehicle itself.

Another object of the present invention is to provide a system to be borne on a vehicle moving on the ground and comprising paired independently rotatable wheels for generating data for locating the position of the moving vehicle on a real time basis.

A further object of the present invention is to provide a system to be borne on a vehicle moving on the ground and comprising paired independently rotatable wheels for generating data for locating the position of the moving vehicle and means for displaying the data.

Still a further object of the present invention is to provide a system to be borne on a vehicle moving on the ground and comprising paired independently rotatable wheels for generating data for locating the position of the moving vehicle, said data being corrected by additional data provided externally of the vehicle, thereby enhancing the accuracy of the system.

These objects, and other objects, features, aspects and advantages of the present invention will be better understood from the following detailed description of the present invention when taken in conjunction with the accompanying drawings.

BRIEF DESCRIPTION OF THE DRAWINGS

FIGS. 2A to 2D show a block diagram of an embodiment of the present invention;

FIG. 14A is a block diagram of another embodiment of the inventive system;

FIG. 15A is a block diagram of still another embodiment of the inventive system;

FIG. 15B is an illustration of a print out format on a paper tape obtainable by the FIG. 15A embodiment;

FIGS. 16A and 16B are illustrations of a modified print out format on the paper tape by the FIG. 15A embodiment;

FIG. 22 is a block diagram of an electrical connection of a modified embodiment of FIG. 21.

DESCRIPTION OF THE PREFERRED EMBODIMENTS

Figure 1:
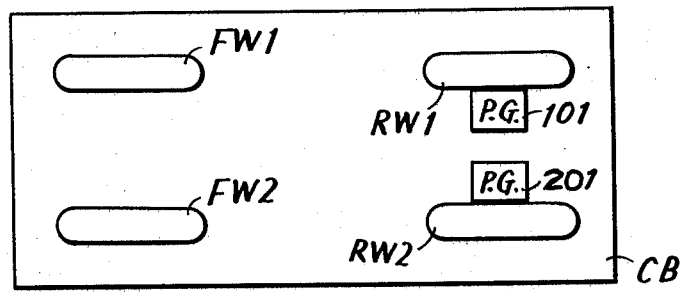
FIG. 1 is a diagrammatical bottom view of a vehicle embodying the present invention.

FIG. 1 is a diagrammatical bottom view of a vehicle such as an automobile of an embodiment of the present invention. The body CB of the automobile comprises a pair of front wheels FW1 and FW2 and a pair of rear wheels RW1 and RW2 provided on the bottom portion thereof. The automobile shown is of a rear wheel drive type and, therefore, the rear wheels RW1 and RW2 are adapted to be driven independently. An aspect of the present invention is that a pair of pulse generators 101 and 201 are provided operatively coupled to the respective shafts of the above described independently driven rear wheels RW1 and RW2, respectively, so as to generate a predetermined number of pulses per each rotation of the respective wheels. Now let it be assumed that the above described pulse generators 101 and 201 are each adapted to generate 100 pulses in succession per one rotation of the rear wheels and the diameter of the rear wheels RW1 and RW2 is dimensioned such that the automobile moves 2 meters per one rotation of the rear wheels. The words "the independently driven wheels" referred to throughout the present specification are intended to mean not only the wheels of the vehicle such as an airplane which are driven totally independently without any associative relation therebetween but also the driving wheels of the automobile which are mutually associated with each other by means of a differentiation gear, in which the paired driving wheels are in principle rotated at the same rotational speed but give rise to the difference in rotation between the paired wheels so as to compensate for the difference in the radius of gyration, the difference in the effective diameter of the wheels due to the imbalance of the load to them, or the like.

FIGS. 2A through 2D illustrate a block diagram of an embodiment of the present invention. Several subsequent stages of the pulse generator 101 and the corresponding subsequent stages of the pulse generator 201 are structured and operate in the same manner. Therefore, in FIG. 2A only those subsequent stages of the pulse generator 101 are shown, while the corresponding reference characters concerned in the pulse generator 201 are shown in parentheses adjacent to the corresponding reference characters concerned in the pulse generator 101 and an illustration of those stages concerned in the pulse generator 201 is omitted.

The pulse output from the pulse generator 101 (201) generated in succession in accordance with the rotation of the wheel RW1 (RW2) in FIG. 1 is applied to a counter 102 (202). The counter 102 (202) makes a counting operation of pulses received from the pulse generator 101 (201) to provide the count value in a bit serial digital value, which can be of six bits at the maximum in the embodiment shown. A timing signal generator 103 (203) is provided to generate a timing signal as shown in (a) of FIG. 3 at predetermined intervals of unit time, for example, one second. The timing signal from the timing signal generator 103 (203) is applied to a shift clock signal generator 104 (204) to trigger it. The shift clock signal generator 104 (204) generates, in response to the timing signal a shift pulse train of extremely high repetition frequency, as shown in (b) of FIG. 3, as compared with that of the pulse generator 102 (202). Each shift pulse train comprises 6 shift clock pulses so that the counter 102 (202), and registers 105 (205), 109 (209) and 306 to be described subsequently can be fully shifted out by each shift pulse train. The shift pulse train is applied to the counter 102 (202) and also applied through an OR gate 107 (207) to the register 105 (205) and further applied to a delay circuit 106 (206). The delay circuit 106 (206) serves to delay a predetermined time period the clock pulse train as inputted to provide a delayed clock pulse train output therefrom, as shown in (c) of FIG. 3, which is applied through an OR gate 107 (207) to the register 105 (205) and is also applied to the register 109 (209) and to the register 306 in FIG. 2B. The output from the delay circuit 106 (206) is also applied to AND gates 111 (211) and 112 (212).

The count value output from the counter 102 (202) is applied to the register 105 (205) and a subtraction circuit 114 (214). The register 105 (205) is further connected to receive, through an OR gate 118 (218), the outputs from AND gates 108 (208) and 110 (210) and the output from the register 105 (205) is applied to the subtraction circuit 114 (214) and is also applied to one inputs of the AND gates 111 (211) and 108 (208).

The subtraction circuit 114 (214) makes subtraction of the pulse count value per present unit time period obtainable from the counter 102 (202) and the pulse count value per preceding unit time period obtainable from the register 105 (205) and the absolute value output therefrom is applied to a compare circuit 115 (215).

The compare circuit 115 (215) is connected to receive a preset value output from a setting circuit 116 (216) for presetting the absolute value for defining an allowable difference between the said two pulse count value. The compare circuit 115 (215) compares both absolute values as inputted, and provides a high level output if and when the output from the subtraction circuit 114 (214), or the difference between the number of pulses at the present unit time period and the number of pulses at the preceding unit time period, is within the allowable difference as preset, and provides a low level output when the output from the subtraction circuit 114 (214) exceeds the allowable difference.

The output from the compare circuit 115 (215) is applied to the AND gates 108 (208) and 111 (211), and is also applied, after it is inverted, to the AND gates 110 (210) and 112 (212). The output from the compare circuit 115 (215) is inverted by an inverter 117 (217) and is applied to a clear input of the register 105 (205).

The output from the AND gate 108 (208) is applied through the OR gate 118 (218) to the register 105 (205), as described above, and is also to the register 109 (209). The output from the register 109 (209) is applied to the AND gate 110 (210). The output from the AND gate 110 (210) is applied through the OR gate 118 (218) to the register 105 (205), as described above, and is also applied to the said AND gate 112 (212). The outputs from the said AND gates 111 (211) and 112 (212) are applied to the OR gate 113 (213). The output from the OR gate 113 (213) is applied to the subsequent input 1 (2) in FIG. 2B in the form of bit serial code signal of the pulse number data.

In operation, let it be assumed that the number of pulses from the pulse generator 101 (201) during the present unit time period is within the allowable difference as preset by the preset circuit 116 (216), as compared with the number of pulses during the preceding unit time period as stored in the register 105 (205). The shift clock signal generator 104 (204) is triggered in response to the output from the timing signal generator 101 (201) as shown in (a) of FIG. 3 to generate a chain of shift clock pulse trains as shown in (b) of FIG. 3. Accordingly, the counter 102 (202) and the register 105 (205) are caused to make a shift operation to transfer the counted value and the stored value, respectively, to the subtraction circuit 114 (214). At that time, the delay circuit 106 (206) does not provide any signal, and accordingly the AND gates 111 (211) and 112 (212) remain inhibited. Therefore, the output from the register 105 (205) is not allowed to pass through the AND gate 111 (211).

The output from the subtraction circuit 114 (214) is applied to the compare circuit 115 (215). Since the absolute value thereof is within the allowable difference from the preset value, the output from the compare circuit 115 (215) becomes the high level. The high level output from the compare circuit 115 (215) enables the AND gates 108 (208) and 111 (211) and, after it is inverted, inhibits the AND gate 112 (212). The said high level output is inverted by the inverter 117 (217) and the inverted output is applied to the clear input of the register 105 (205) is not cleared.

Figure 3:
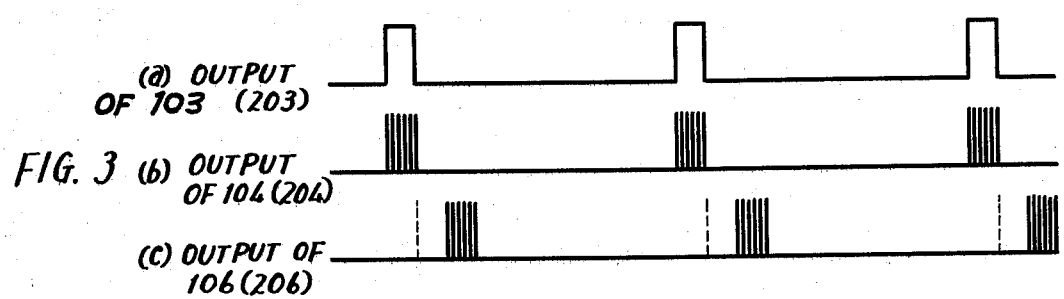
FIG. 3 shows waveforms of the signals at various portions in the FIG. 2A embodiment.

Shortly thereafter, or the predetermined delay time (short enough as compared with the subsequent timing signal) thereafter, the delayed shift clock pulse train, as shown in (c) of FIG. 3, is obtained from the delay circuit 106 (206). Therefore, the registers 105 (205 and 109 (209) are caused to make a synchronous shift operation.

At that time, the AND gates 108 (208) and 111 (211) have been enabled and the AND gate 110 (210) has been inhibited. Therefore the output from the register 109 (209) is not applied to the register 105 (205). The output from the register 105 (205), i.e. the pulse count value at that timing, as judged as normal, is stored through the AND gate 108 (208) in the registers 105 (205) and 109 (209) and is withdrawn therefrom through the AND gate 111 (211) and the OR gate 113 (213) as a function of the delayed shift clock pulse train. As a result, at the end of the output from the delay circuit 106 (206), the pulse count value as judged as normal at that timing is stored in the register 105 (205) and the pulse count value as judged as normal at the preceding timing is stored in the register 109 (209), while the count value at the present timing stored in the register 105 (205) is withdrawn through the OR gate 113 (213). The output from the OR gate 113 (213) is applied to the input 1 (2) of the FIG. 2B illustration.

Now assume that the number of pulses obtained from the pulse generator 101 (201) at the present unit time period is abnormal enough to exceed the allowable difference as preset by the preset circuit 116 (216) as compared with the number of pulses at the preceding unit time period stored in the register 105 (205). The contents stored in the counter 102 (202) and the register 105 (205) are read out as a function of the clock signals as shown in (b) of FIG. 3 and are applied to the subtraction circuit 114 (214), as described previously, and at the same time, the register 105 (205) stores the pulse count value including an abnormal change transferred from the counter 102 (202).

The output from the subtraction circuit 114 (214) is applied to the compare circuit 115 (215). However, since the absolute value thereof exceeds the preset value, the compare circuit 115 (215) provides a low level output. The low level output is inverted by the inverter 117 (217) to be the high level signal, as shown in the dotted line in (c) of FIG. 3, which is applied to the clear input of the register 105 (205), thereby to clear the register 105 (205). The low level output from the compare circuit 115 (215) is also applied to the AND gates 108 (208) and 111 (211) to inhibit or disable them, and after it is inverted, applied to the AND gates 110 (210) and 112 (212) to enable them.

The predetermined delay time thereafter, the delayed shift clock pulse train is withdrawn from the delay circuit 106 (206). Therefore, the registers 105 (205) and 109 (209) are caused to make a synchronous shift operation. At that time, the AND gates 108 (208) and 111 (211) are inhibited while the AND gate 110 (210) is enabled. Therefore, the output from the register 109 (209), i.e. the count value as judged as normal at the preceding timing, is transferred to the register 105 (205) through the AND gate 110 (210) and the OR gate 118 (218), and is withdrawn through the AND gate 112 (212) and the OR gate 113 (213) as a function of the said delayed shift clock pulse signals. The output from the register 105 (205), i.e. the count value as judged as abnormal at the present timing, is caused to overflow, without being applied to the register 109 (209). At the end of the output from the delay circuit 106 (206), the pulse count value as judged as normal at the preceding timing has been stored in the register 105 (205), while nothing is stored in the register 109 (209), and the count value at the preceding timing stored in the register 105 (205) is withdrawn through the OR gate 113 (213). The output from the OR gate 113 (213) is applied to the input 1 (2) in FIG. 2B.

As seen from the foregoing description, if and when the number of pulses generated at the present unit time period does not include an abnormal change, then the number of pulses obtained at that time period is withdrawn, and if and when the number of pulses generated at the present unit time period includes an abnormal change, then the number of pulses generated at the preceding unit time period which has been judged as normal previously is withdrawn. As a result, errors caused by slippage of the wheels or the like can be avoided which might cause the above described abnormal change in the number of pulses per unit time period.

In the above described embodiment, the count value of the pulses obtained from the pulse generater was used. Alternatively, however, the pulse train as obtained from the pulse generator may be used for the purpose of the present invention, while the judgement is made whether the pulse train includes an abnormal change in the pulse frequency and compensation is made therefor by selectively withdrawing the delayed pulse train obtained from the delay circuit in response to the judgement of the abnormality. Instead of the judgement of the abnormality in the pulse repetition frequency by means of various digital circuits in the foregoing embodiment, an alternative analog means, such as an angular accelaration meter may be used for the same purpose. Employment of the above described correction circuit ensures that more accurate calculation of the speed and the moving distance, and thus recording of the moving path of the vehicle are performed.

Figure 2A:
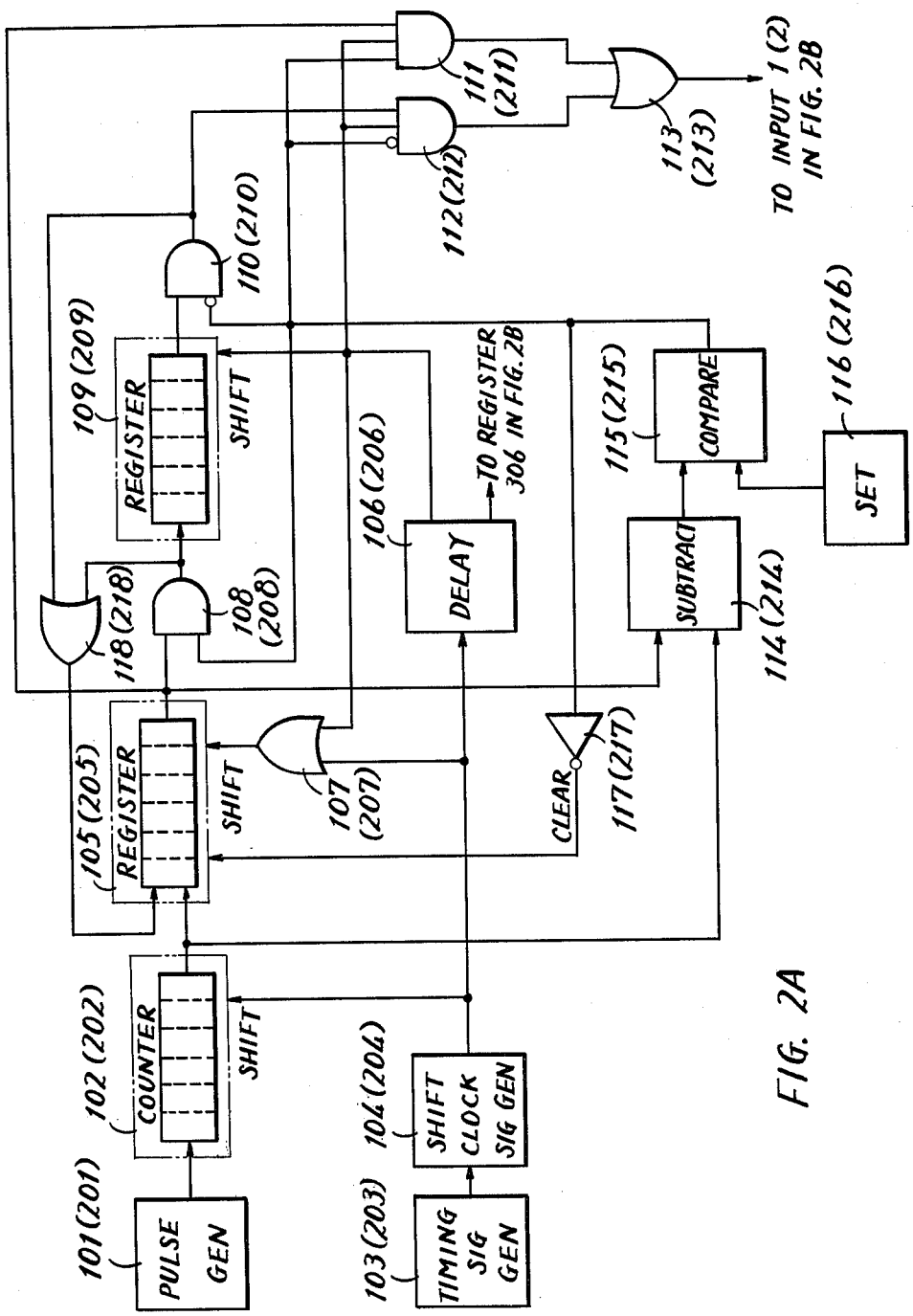
Figure 2B:
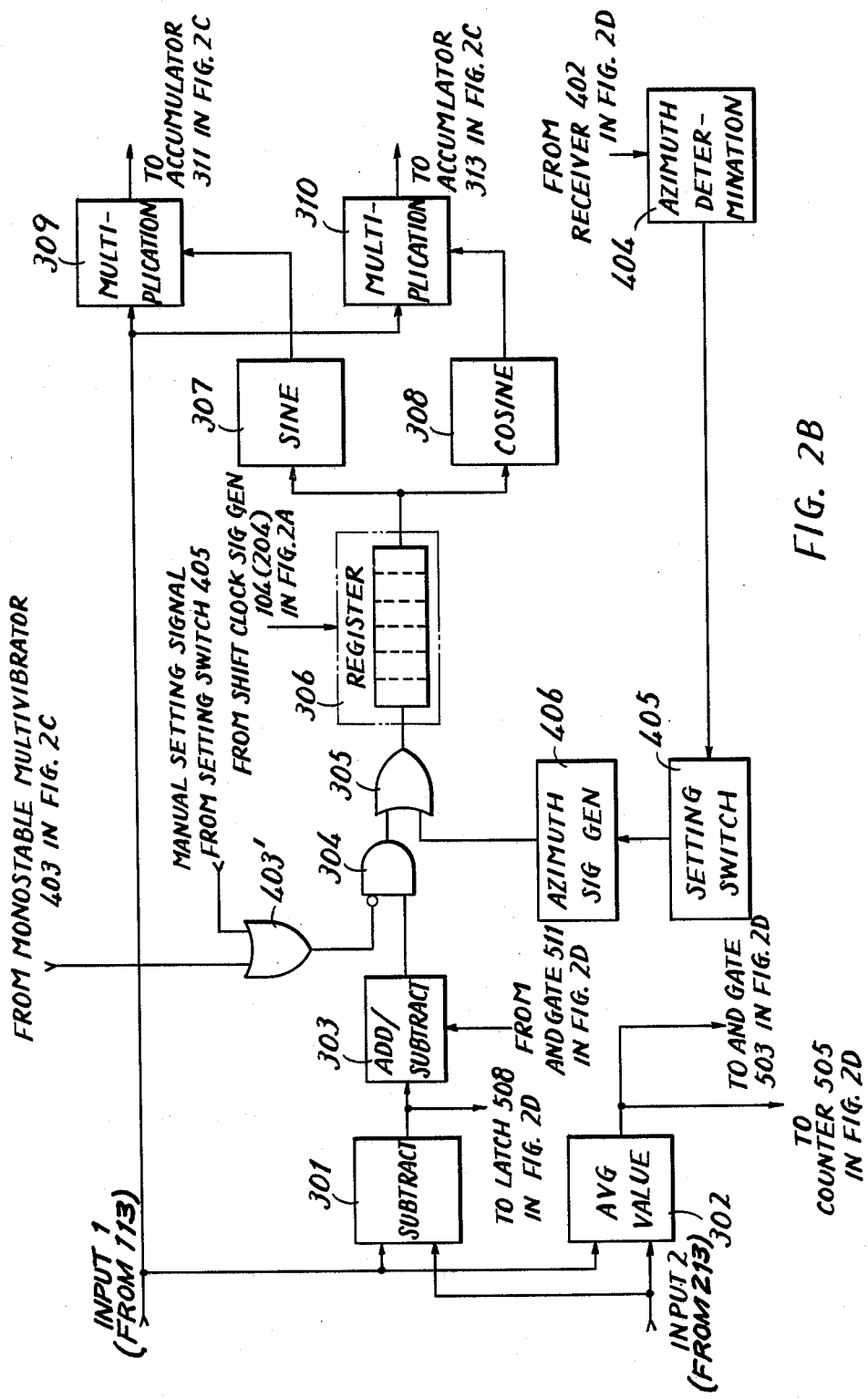

An output from the OR gate 113 in FIG. 2A representative of the number of pulses obtainable per unit time period as for the wheels RW1 is applied to one input of a subtraction circuit 301 and an average value circuit 302. An output from the OR gate 213 representative of the number of pulses per unit time period as for the wheel RW2 is also applied to the other input of the subtraction circuit 301 and the average value circuit 302. The output from the OR gate 113 is also applied to multiplication circuits 309 and 310 by way of a factor for operating the moving distance of the automobile per unit time period.

The above described subtraction circuit 301 receives from the OR gates 113 and 213 the data concerning the number of pulses generated per unit time period as for the wheels RW1 and RW2 and the difference output therefrom is applied to an addition/subtraction circuit 303 and a latch circuit 508 (to be described subsequently with reference to FIG. 2D) by way of a factor for the moving direction at that unit time period.

Now detailed description will be made of the said subtraction circuit 301 with reference to FIG. 2E, which shows a block diagram of the subtraction circuit 301. The pulses obtained through the OR gates 113 and 213 for each unit time period are applied in succession to accumulators ACS1 and ACS2, respectively, and cumulatively counted therein, while the pulses are also loaded in registers RS1 and RS2. The outputs from the registers RS1 and RS2 are applied to a subtractor SB1, which evaluates the difference $SB_{tn}$ between the pulse numbers from pulse generators 101 and 201, respectively, which is then loaded in a subsequent register RS3. At that time, the difference $SB_{tn-1}$ between the pulse numbers for the preceding unit time period ($tn-1$) has been loaded in a further subsequent register RS4. A subtractor SB2 makes subtracting operation of the value $SB_{tn-1}$ in the register RS4 from the value $SB_{tn}$ in the register RS3, i.e. $SB_{tn} - SB_{tn-1} = \Delta SB$. In other words, the subtractor SB2 is adapted to evaluate the difference $\Delta SB$ between the pulse number difference between both pulse generators for the present unit time period and the pulse number difference between both pulse generators for the preceding unit time period. The output $\Delta SB$ from the subtractor SB2 is applied to a subsequent divider DIV, where the output $\Delta SB$ is divided by the factor 2 to evaluate $\Delta SB/2$, which output ½ $\Delta SB$ is applied to an adder ADD.

The outputs from the accumulators ACS1 and ACS2 are applied to a subtractor SB3. The subtractor SB3 receives the values in the accumulators ACS1 and ACS2, i.e. the accumulated values of the pulses obtained from both pulse generators 101 and 201, respectively, and evaluates the difference $SB_n$ of the pulse numbers obtained so far from both pulse generators 101 and 201, respectively, and evaluates the difference $SB_n$ of the pulse numbers obtained so far from both pulse generators 101 and 201, respectively. The output $SB_n$ from the subtractor SB3 is loaded in a subsequent register RS5. As a result, the register RS5 has been loaded, as of the present unit time period ($tn$), with the difference $SB_{n-1}$ between the accumulated pulse numbers up to the preceding unit time period ($tn - 1$). The output from the register RS5 is applied to the said adder ADD. The adder ADD makes adding operation ($SB_{n-1} + \frac{1}{2} \Delta SB$) with respect to two inputs $SB_{n-1}$ and ½ $\Delta SB$. In other words, the adder ADD evaluates the difference output from the subtracting circuit 301 to be applied to a subsequent addition/subtraction circuit 303 during the present unit time period ($tn$). Thus, it can be appreciated that implementation of the subtraction circuit 301 in the manner as described above is aimed to evaluate the heading direction (angle) of the vehicle not at a respective unit time period but at the middle point between a given unit time period and the subsequent unit time period.

It would be readily appreciated that evaluation of the heading direction of the vehicle at the middle point between a given unit time and the subsequent unit time makes a possible error minimal. The reason is that a gradient of a curve running between given two points can be obtained with minimum error when such a gradient is obtained at the middle point therebetween, as well known to those skilled in the art.

Although now shown, the average value circuit 302 may also be structured such that the pulse outputs obtainable from the OR 113 and 213 for each unit time period are cumulatively counted by means of the accumulators, as done in the above described subtraction circuit 301. Thus, the pulse outputs obtainable from both pulse generators 101 and 201 for each unit time period are accumulated in succession in the subtraction circuit 301 and the average value circuit 302, as the vehicle moves continuously starting from a given point.

The addition/subtraction circuit 303 makes addition or subtraction of the above described difference output and the output from an AND gate 511 as to be described subsequently with reference to FIG. 2D, and the output therefrom is applied to one input to an AND gate 304. The average value circuit 302 obtains the average value by summing the data concerning the number of pulses per unit time period obtained from the two OR gates 113 and 213 and by dividing the sum by two, and the average value output therefrom is applied to one input of an AND gate 503 and a count input of a counter 505 to be described subsequently with reference to FIG. 2D.

Another input to the AND gate 304 is connected to receive an inversion of an output from an OR gate 403' which receives an output of a monostable multivibrator 403 to be described subsequently with reference to FIG. 2C and a manual setting signal of a setting switch 405 to be described subsequently with reference to FIG. 9. An output of the AND gate 304 is applied to a register 306 through an OR gate 305 another input of which is connected to receive an output of an azimuth signal generating circuit 406 to be described subsequently. The register 306 receives a shift pulse described with reference to FIG. 2A so that a data stored therein is shifted in synchronism with the shift operation in the counter 102 (202) and the registers 105 (205) and 109 (209). The output from the AND gate 304 is indicative of the difference of the rotations and thus the difference of the moving distance of both wheels RW1 and RW2 and this rotation difference includes the data in terms of the number of pulses associated with the angle indicative of the moving direction of the automobile on the assumption that the moving direction is a straight line. The output from the azimuth signal generating circuit 406 also includes data in terms of the number of pulses associated with the moving direction.

The output from the register 306 is applied to sine and cosine circuits 307 and 308, respectively, in terms of the number of pulses associated with the moving directional angle of the automobile. The sine circuit 307 provides the sine value for the angle corresponding to the number of pulses from the register 306 and applies it to the multiplication circuit 309. The cosine circuit 308 provides the cosine value for the angle corresponding to the number of pulses from the register 306 and applies it to the multiplication circuit 310. Accordingly, the multiplication circuit 309 provides the moving distance of the automobile (in the above described example the distance of 2 meters per 100 pulses) based upon the number of pulses per unit time period as inputted and makes multiplication of the moving distance and the sine value to provide a Y-axis component per unit time period on the co-ordinate for showing the moving point of the automobile. On the other hand, the multiplication circuit 310 makes multiplication of the moving distance and the cosine value to provide an X-axis component per unit time period on the co-ordinate for showing the moving point of the automobile.

The above described sine circuit 307 and the cosine circuit 308 makes a multiplying operation of a factor (constant) which is preset and associated with the difference between the above described pulse numbers thereby to evaluate a moving directional angle of the vehicle. This is because the geometry of the wheels, i.e. the diameters of the wheels, the distance between both wheels, and the like are different depending on the vehicle and the relation between the number of pulses and the moving direction is changeable depending on the geometry of the wheels.

Figure 2C:
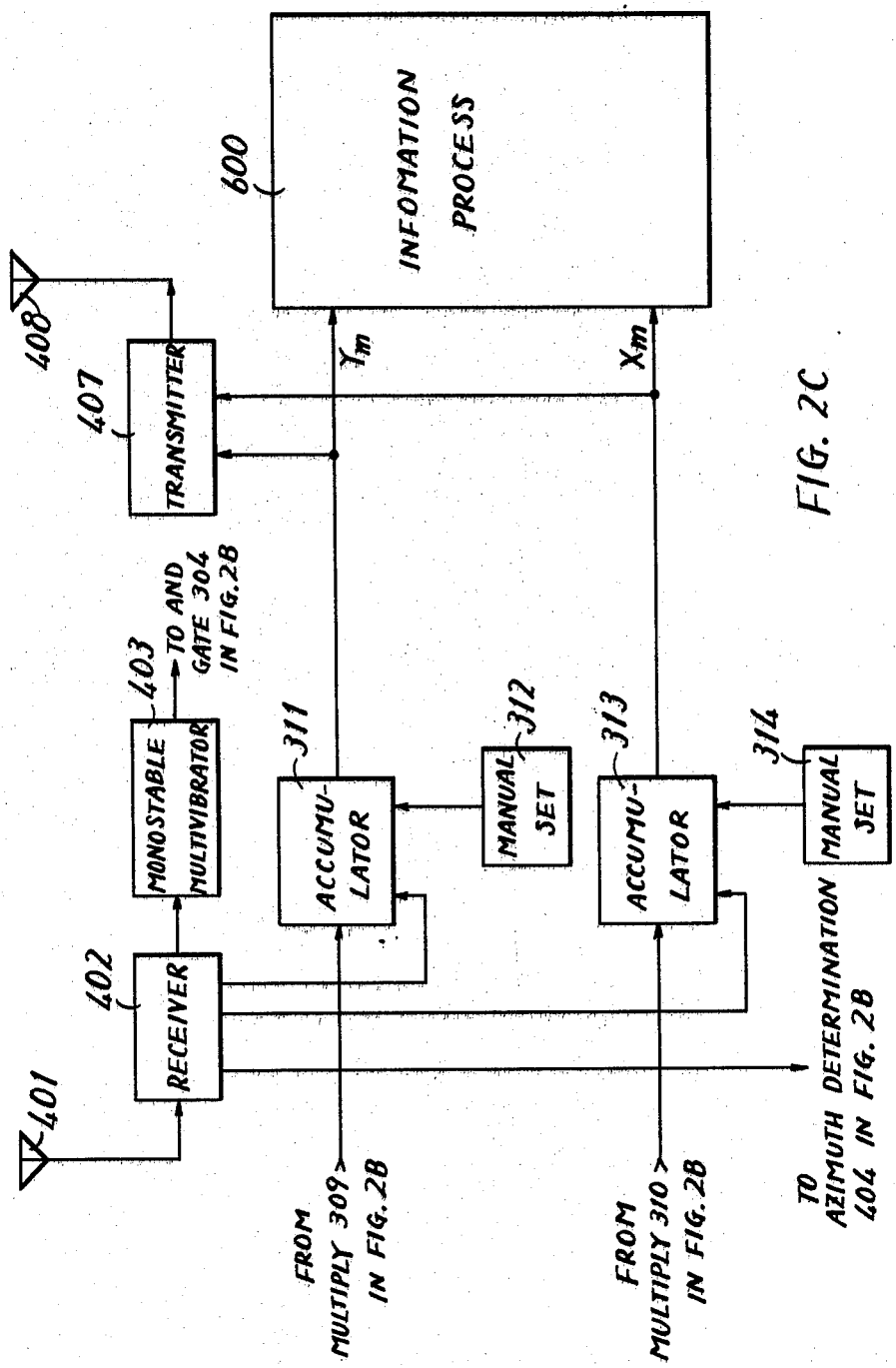
Figure 2E:
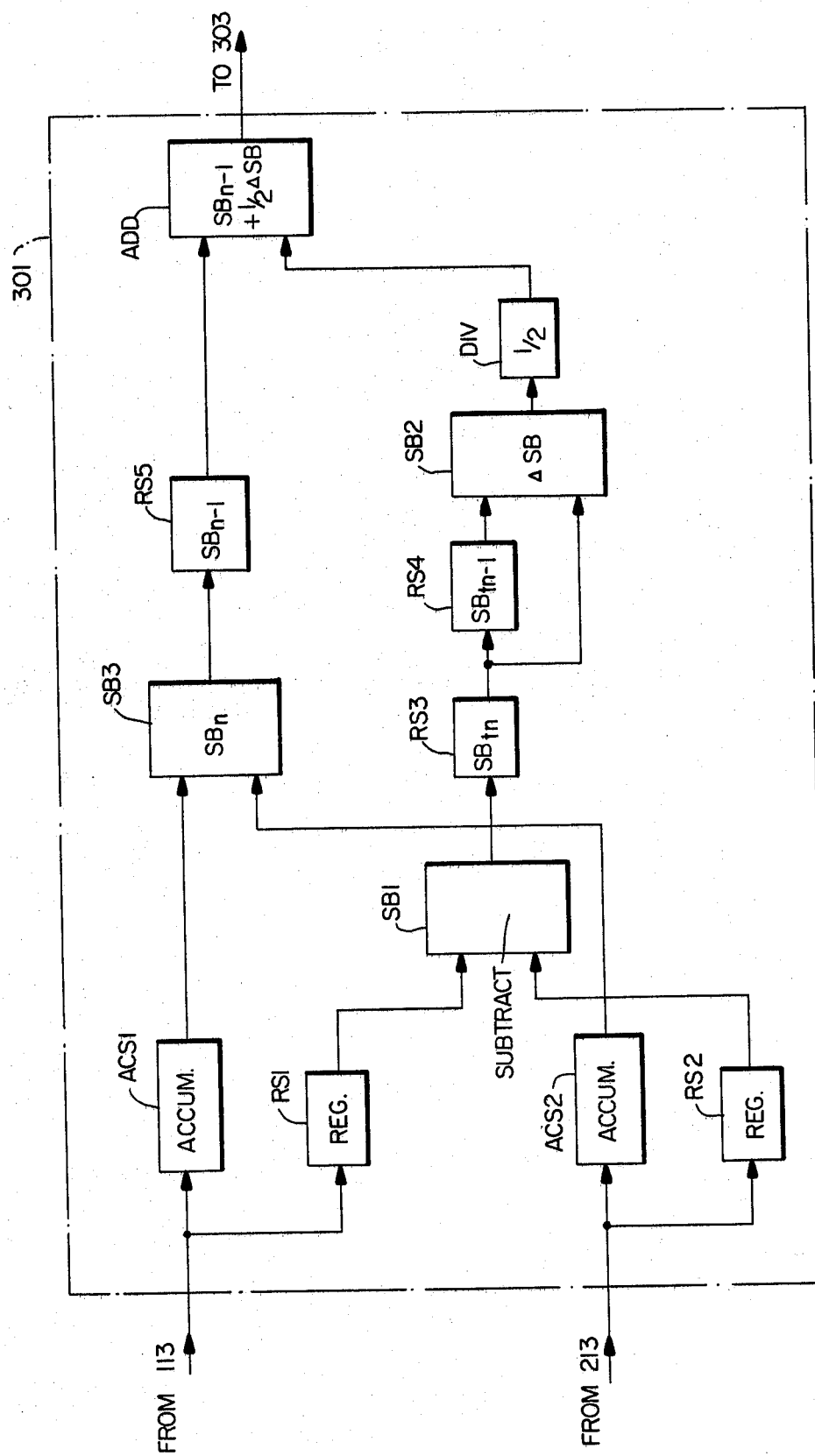
FIG. 2E is a more detailed block diagram of the subtraction circuit 301 of FIG. 2B.

Referring to FIG. 2C, the output from the multiplication circuit 309, i.e. the Y-axis component per unit time period is cumulatively summed by an accumulator 311 to provide an output Ym, while the output from the multiplication circuit 310, i.e. the X-axis component per unit time period is cumulatively summed by an accumulator 313 to provide an output Xm.

It is also necessary to multiply the distance input to be applied to the multiplying circuits 309 and 310 by the above described preset factor (constant) associated with the pulse numbers. This is because the number of pulses and thus the moving distance per one rotation of the wheels is changeable depending on the diameter of the wheels.

The accumulators 311 and 313 are connected to receive setting inputs from manual setting circuits 312 and 314 for manually setting the original point of the movement of the automobile. In addition, the accumulators 311 and 313 are preferably supplied with an output of a radio receiver 402 for providing the correction data associated with X-axis and Y-axis factors as to be more fully described subsequently. The outputs Ym and Xm from the accumulators 311 and 313, respectively, are applied to a transmitter 407 and an information processing circuit 600. It is to be pointed out that the above described Y-axis component Ym and X-axis component Xm are withdrawn in terms of the digital value, such as a BCD code.

The transmitter 407, which is similar to a transmitter 701 to be described subsequently, serves to transmit these components Ym and Xm in the form of the digital signals indicative of the positional information of the vehicle through a transmitting antenna 408 to a central monitor apparatus, such as a control tower for airplanes in an airport, a traffic information center of the police, an instructing center for taxis and trucks and the like. Thus it is possible to control various vehicles such as automobiles and airplanes in an airport or the like, according to the present invention.

Now with reference to FIG. 2D, description will be made of a check circuit for providing a correction signal to the addition/substraction circuit 303 depending upon the condition of the vehicle during the straight directional movement. An output of a check mode setting means 501 for manually setting a check mode is applied to a set input of a flip-flop 502 and is also applied to a latch circuit 508 as a clear signal. The set output from the flip-flop 502 is applied to the other input of the AND gate 503. The output of the AND gate 503, i.e. the output of the average value circuit 302 as conditioned by the check mode setting is applied to a counter 504 which counts the average value obtained from the average value circuit 302 for a predetermined moving distance, for example, the distance of 200 meters. When the counter 504 completes the count of the number of pulses commensurate with the said predetermined distance, a count up output is obtained and is applied to the reset input of the flip-flop 502 and is also applied as a trigger signal to a delay circuit 507 and the latch circuit 508. The latch circuit 508 serves to hold the difference output from the subtraction circuit 301 in response to the said trigger signal. The said difference output from the latch circuit 508 is applied to a parallel-series converter 509 to convert the output into a bit serial coded signal which is applied to a frequency divider 510. The frequency divider 510 serves to frequency divide the said difference output and the output therefrom is applied to an input of an AND gate 511 which is enabled by the output from the said delay circuit 507. The delay circuit 507 serves to apply the output from the parallel-series converter 509 and the frequency divider 510 in the synchronized manner to the addition/substraction circuit 304 through the AND gate 511. The frequency divider 510 serves to frequency divide the said difference signal to 1/100, since the difference signal is inputted per one rotation of the wheel wherein 100 pulses are generated and thus 100 rotations fo the wheel are necessary for the movement of the distance of 200 meters. The output from the AND gate 511 is applied to the addition/subtraction circuit 303 by way of an addition input or a subtraction input depending upon the sign of the output signal.

The output from the average value circuit 302 is also applied to the counter 505. The counter 505 serves to withdraw correctly the output from the frequency divider 510 and thus the AND gate 511 per one rotation of the wheels RW1 and RW2. Accordingly, the counter 505 provides a count up output therefrom when it counts the number of pulses generated per one rotation of the wheels RW1 and RW2 (in the above described example, 100 pulses) and the count up output is applied to a shift clock signal generator 506 as a trigger signal. The output from the shift clock signal generator 506 is applied to the parallel-series converter 509 as a shift clock.

Figure 4:
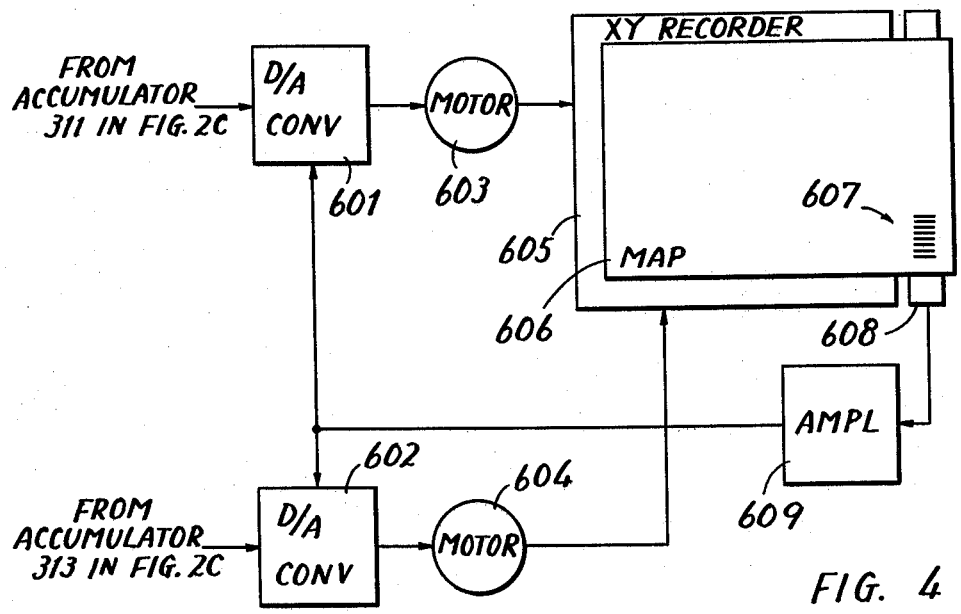
FIG. 4 is a block diagram of a preferred embodiment of an information processing apparatus 600 for use in the inventive system.

FIG. 4 shows a preferred embodiment of an information processing circuit 600 of the present invention. The embodiment shown is adapted to plot the moving position of the vehicle on the map. The output from the accumulator 311 of FIG. 2C is applied to a digital-analog converter (referred to as D/A converter hereinafter) 601 for the Y-axis in as XY recorder 605 and the output from the accumulator 313 is applied to D/A converter 602 for the X-axis of the X-Y recorder 605. The Y-axis D/A converter 601 converts the coded signal of the Y-axis component $Y_m$ (digital value) obtained from the accumulator 311 into the corresponding analog value to drive a Y-axis directional drive motor 603, thereby to move a pen (not shown) in the Y-axis direction. The X-axis D/A converter 602 converts the coded signal of the X-axis component $X_m$ (digital value) obtained from the accumulator 313 into the corresponding analog value to drive the X-axis directional drive motor 604, thereby to move the said pen in the X-axis direction. The said pen is caused to plot the position as defined by the actual numerical information on the map 606 particularly prepared and mounted on the X-Y recorder 605.

The map 606 is prepared in advance for each region on various reduced scales. Each map 606 comprises a machine readable recording 607 indicative of the reduced scale. Such reduced scale indicating recording 607 is preferably formed at a corner portion of the map 606 and the X-Y recorder 605 comprises a reader 608 for reading mechanically the reduced scale indicating recording 607 when the map 606 is mounted to the recorder 605. The output from the reader 608 is applied to the respective D/A converters 601 and 602 by an amplifier 609. The data processing in the D/A converters 601 and 602 is controlled such that the recording operation by the X-Y recorder 605 is carried out in the prescribed association with the reduced scale of the map 606. This enables the mounting of the map 606 to automatically adapt the recording by the X-Y recorder 605 to the reduced scale of the map.

The receiver 402 in FIG. 2C receives through a receiving antenna 401 an electric wave transmitted from a transmitter 701 (FIG. 7A) fixedly provided on the ground to be described subsequently and the output therefrom is applied to the accumulators 311 and 313 and an azimuth determination circuit 404. The azimuth determination circuit 404 provides an azimuth signal based upon the received waves obtained from the receiver 402 and is applied to the setting switch 405, which is turned on based on the said azimuth signal. The ON signal from the said setting switch 405 is applied to the aximuth signal generating circuit 406. The output from the azimuth signal generating circuit 406 is applied to the register 306 through the OR gate 305.

Figure 5:
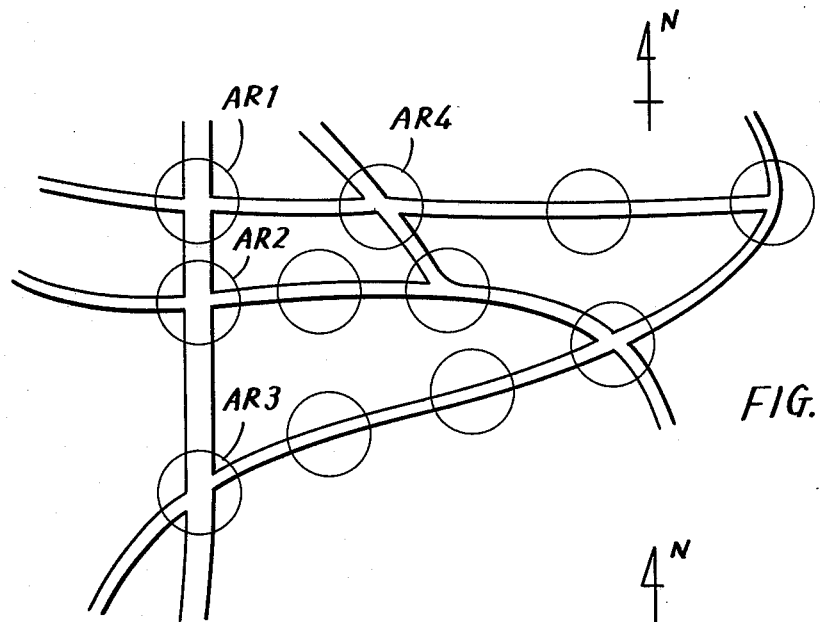
FIG. 5 is a diagrammatical view of an arrangement of roads wherein the present invention was embodied.
Figure 6:
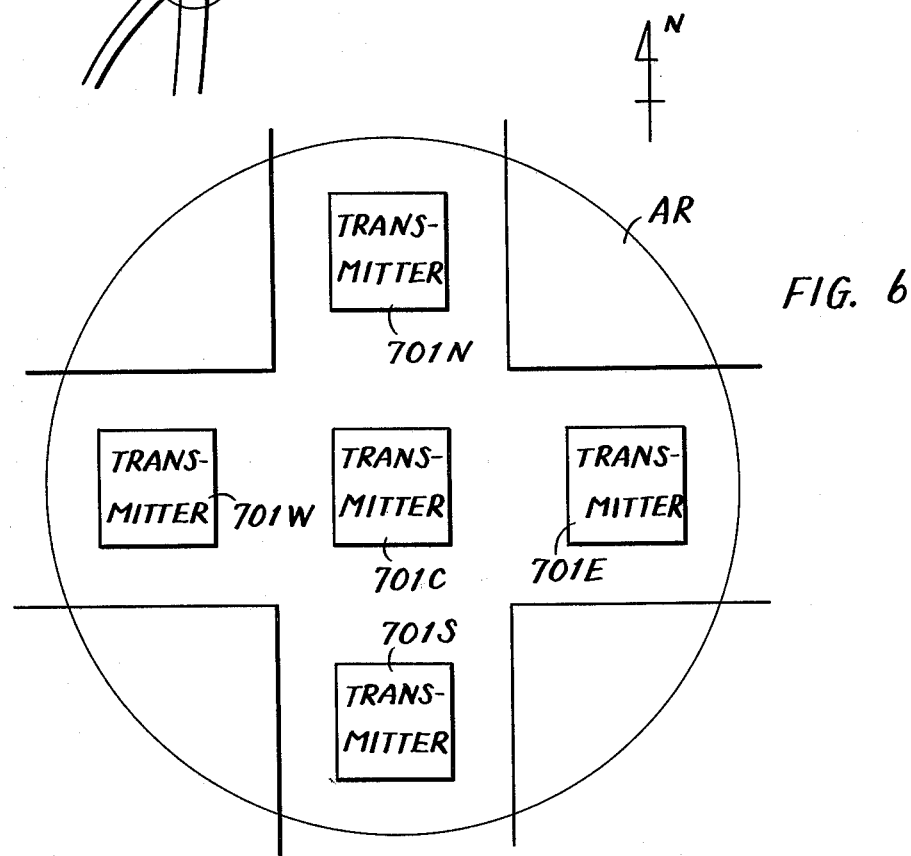
FIG. 6 is an enlarged illustration of a portion of the FIG. 5 illustration.

FIG. 5 diagrammatically illustrates an arrangement of roads wherein the present invention is embodied. FIG. 6 diagrammatically illustrates in detail a typical example of specified areas in the FIG. 5 arrangement. The specified areas such as the intersections of the roads in the FIG. 5 road arrangement each comprise service areas AR1, AR2, AR3, AR4 . . . as a function of the grouped transmitters shown in FIG. 6.

A typical area AR, as shown in FIG. 6 comprises five fixed ground transmitters 701C, 701N, 701E, 701S, and 701W to ensure the azimuth determination by the said azimuth determination circuit 404. The service area AR may be so small that the transmitted waves can be received only in the vicinity of the positions where the transmitters 701C, 701N, 701E, 701S, and 701W to ensure the azimuth determination by the said azimuth determination circuit 404. The service area AR may be so small that the transmitted waves can be received only in the vicinity of the positions where the transmitters 701C, 701N, 701E, 701S and 701W are located and the adjacent service areas, such as AR1 and AR2, are spaced from each other so that these are not overlapped and thus not conflicted, thereby to enable individual discrimination of the transmitted waves. Accordingly, the transmitting power of the respective transmitting stations employed in the embodiment of the present invention may be very weak and therefore is not subject to governmental control under wave transmission laws or the like in the installation thereof.

Figure 7A:
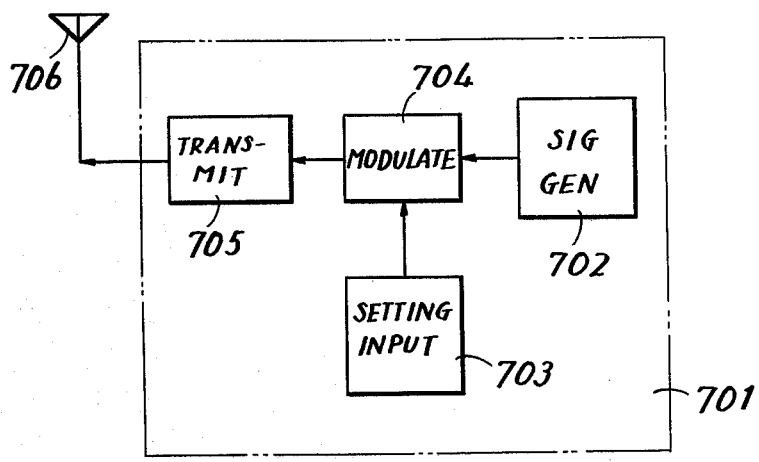
FIG. 7A is a block diagram of a preferred embodiment of a transmitter 701 in FIG. 6.

Referring to FIG. 7A, the ground transmitter 701 is described. The output from a signal generator 702 normally generating a microwave signal is applied to a modulator 704. The modulator 704 may be comprised of a N-bit shift register and a gate, for example. On the other hand, a setting input circuit 703 is aimed to enter the numerical information representative of the latitude and the longitude of the point where the transmitter is located and the output therefrom is applied to the N-bit shift register to set the digital signalling. The output from a microwave signal generator 702 and the output from the shift register are ANDed and AND processed to effect modulation in terms of the digital numerical information to provide a coded pulse train. The input circuit 703 may be built in the transmitter, but preferably it may be fabricated independently and be mounted, after it is set for the data concerned, to the transmitter which has been manufactured on a mass production basis and already installed, in view of the number of transmitters. The pulse train signal as thus modulated and coded is inputted to the transmitting circuit 705. The output therefrom is transmitted as an electric wave through a transmitting antenna 706.

Figure 7B:
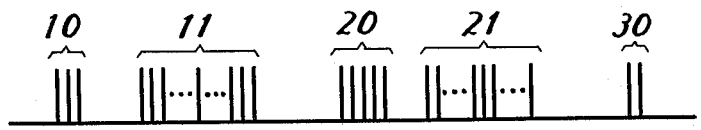
FIG. 7B shows an example of the electric wave transmitted from the FIG. 7A transmitter.

FIG. 7B is a waveform of one full cycle of the electric wave transmitted from the transmitter 701 shown in FIG. 7A. The transmitted wave basically comprises three kinds of signal components transmitted on the same carrier of the said pulses on a time sharing basis. The latitude (the Y-axis component of the said X-Y recorder 605) setting signal 10 for indicating that the subsequent signal is for latitude information and the longitude (the X-axis component of the X-Y recorder 605) setting signal 20 for indicating that the subsequent signal is for longitude information are adapted to be different from each other so as to be distinguishable from each other by proper combinations of the pulses. Subsequent to the said latitude setting signal 10, the latitude information signal 11 is transmitted which is indicative of the inherent latitude information of the location of the transmitter 701. Subsequently of the said longitude setting signal 20, the longitude information signal 21 is transmitted which is indicative of the inherent longitude information of the location of the transmitter. The said information signals 11 and 21 are prepared in the binary form as the digital signal indicative of the numerical information decimal number by means of the modulation circuit 704 by proper processing, such as suppressing undesired pulses of the pulse train. The said information signals 11 and 21 are followed by transmission of the coded signal 30 uniquely assigned to instruct the start of driving the pen of the X-Y recorder 605. The coded signal 30 may preferably include directional information indicative of the direction of the vehicle within the area AR. Thus, the transmitted wave comprises the signals 10, 11, 20, 21 and 30 in one full cycle thereof, these signals being transmitted on the same carrier on a time sharing basis.

Figure 8:
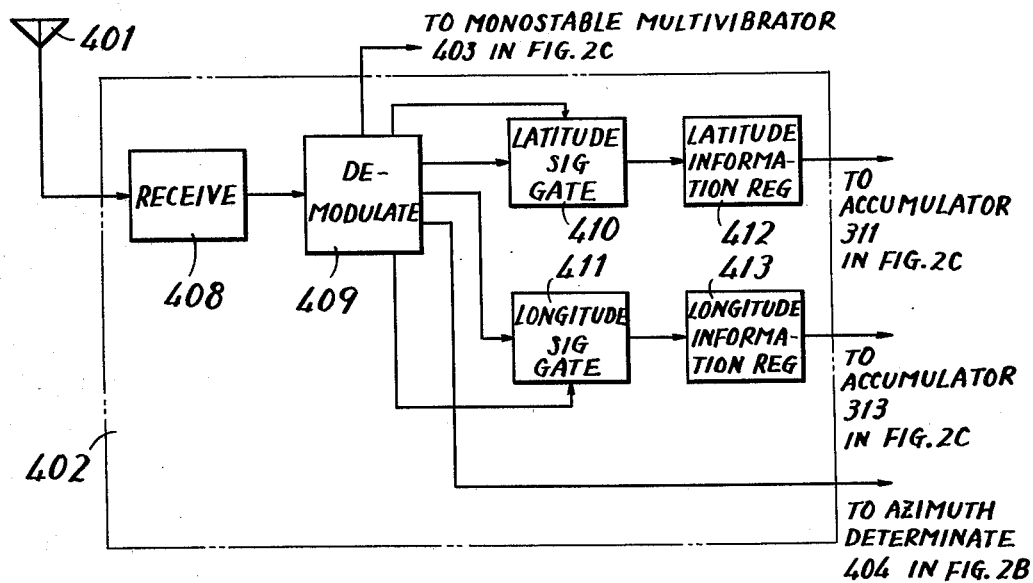
FIG. 8 is a block diagram of a preferred embodiment of a receiver in FIG. 2C.

FIG. 8 is a block diagram of the receiver shown in the FIG. 2C embodiment of the present invention. The electric wave received by the said receiver 402 through the receiving antenna 401 is inputted to a demodulator 409 through the receiving circuit 408 which usually comprises suitable amplifiers, wave shaping circuits, and the like. The latitude information signal (the Y-axis component of the X-Y recorder 605) out of these output signals from the demodulating circuit 409 is loaded and stored in the latitude information register 412 throught the latitude signal gate 410 which is enabled by the said latitude setting signal 10. On the other hand, the longitude information signal (the X-axis component of the X-Y recorder 605) out of these output signals from the demodulating circuit 409 is loaded and stored in the longitude information register 413 through the longitude signal gate 411 which is enabled by the said longitude setting signal 20. The digital information signals as stored in the registers 412 and 413 are applied to the accumulators 311 and 313, respectively. The code signal serving as the pen drive signal assigned to the respective transmitter obtained from the demodulating circuit 409 is applied to the subsequently described azimuth determination circuit 404. In addition, another signal indicative of the receipt of the electric wave from the said transmitter 701 is withdrawn from the demodulating circuit 409 and is applied to a monostable multivibrator 403 in FIG. 2C as a trigger signal. Accordingly, the monostable multivibrator 403 is triggered by the trigger signal and thereafter a high level output is obtained for a time period necessary for processing the information from the receiver 402 by the register 306. The high level output is inverted and applied to the AND gate 304 to inhibit it, as described previously.

Figure 9:
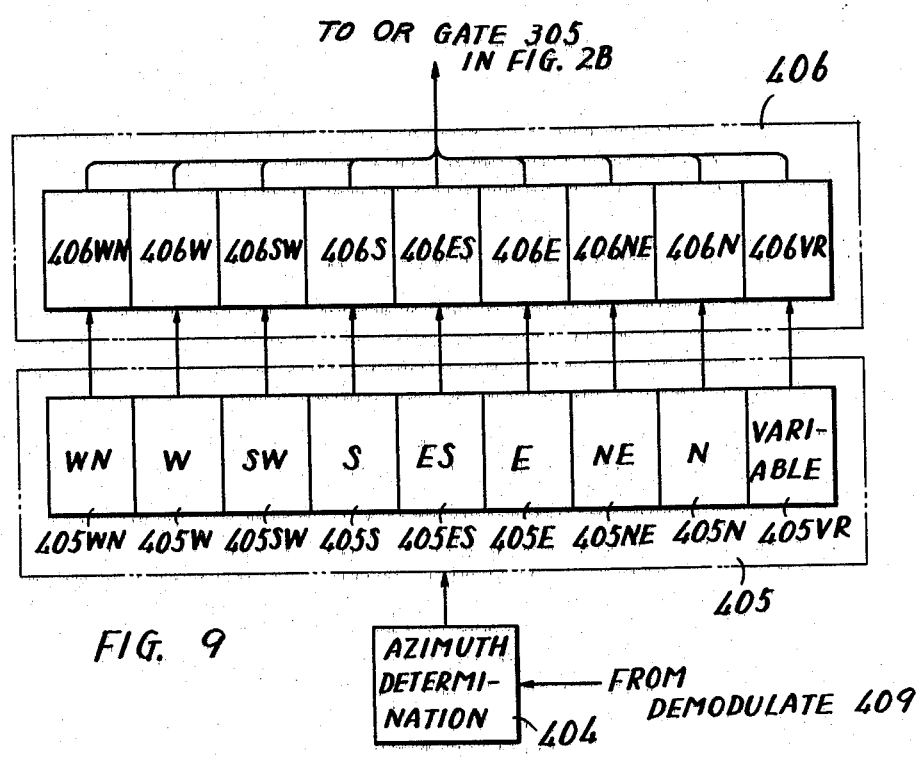
FIG. 9 is a block diagram showing in more detail the major portion of the FIG. 2B illustration.

The azimuth determination circuit 404, the setting switch 405 and the azimuth signal generating circuit 406 in FIG. 2C are shown in more detail in FIG. 9. The said plurality of transmitters 701C ... 701W each transmit uniquely identifying information. This identifying information is received by the receiving antenna 401 and is inputted to the said receiver 402. Accordingly, the receiver 402 provides the co-ordinate positional signals for the X-axis and the Y-axis associated with the said area, which are applied to the accumulator 313 and 311, whereby the X-axis and the Y-axis factors are corrected, as necessary. More specifically, the co-ordinate positional signals for the vehicle are corrected to the X-axis and the Y-axis factors associated with the present position defined by the transmitter.

The azimuth determination circuit 404 receives each of the transmitter code signals from the demodulating circuit 409 in the receiver 402 to make judgement as to what direction (azimuth) the said vehicle is moving in. With reference to the area AR shown in FIG. 6, for example, the reception of the signals in the order of the transmitters 701C to 701N is judged as moving toward the north and the azimuth signal is obtained for turning on the switch 405N of the north N of the setting switch 405 to be described subsequently. The reception of the signals in the order of the transmitters 701S to 701C is judged as moving toward the south, the reception of the signals in the order of the transmitters 701E to 701C is judged as moving toward the east and the reception of the signals in the order of transmitters 701W to 701C is judged as moving toward the west, and so on.

The setting switch 405 in FIG. 2B in which the corresponding azimuth switch is turned on upon receipt of the azimuth signal from the azimuth determination circuit 404 comprises a plurality of push button, as shown in FIG. 9, which may preferably be adapted to be also manually operated to turn on thereby to provide the manually set azimuth signal. The setting switch 405 comprises eight switches 405N to 405NW for the directions of north N to the north west NW and a variable switch 405 VR for continuously setting any desired direction. Each of the switches 405WN to 405VR of the setting switch 405 is connected to the corresponding signal generators 406WN to 406VR of the azimuth signal generating circuit 406 in order to individually enable it. More specifically, when the switch 405N for the north N, for example, is turned on, the corresponding signal generator 406N of the azimuth signal generating circuit 406 provides a code signal of the data in terms of the number of the pulses (corresponding to the addition/subtraction ciruit 303) indicative of the north or "0°". The north east NE is represented by "45°", the east E is represented by "90°", the south east ES is represented by "135°", the south S is represented by "180°", the south west SW is represented by "225°", the west W is represented by "270°", the north west WN is represented by "315°", each in terms of the code signal of the pulse number data, which is supplied to the OR gate 305 and thus to the register 306. When the variable switch VR is turned on, any desired direction can be set manually and the pulse number data signal corresponding to the set direction is provided.

Figure 10:
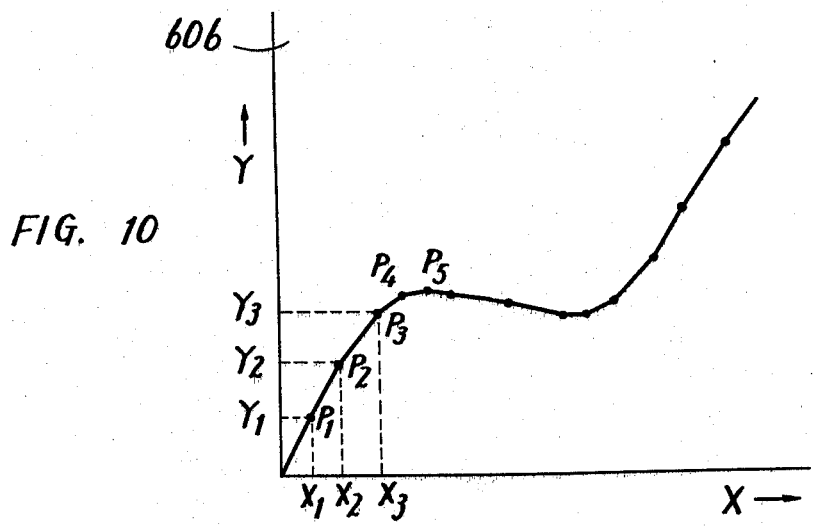
FIG. 10 shows an example of the moving path drawn in accordance with the inventive system.

FIG. 10 is a graph showing a curve of the moving path of the vehicle drawn in accordance with a preferred embodiment of the present invention. Now, description will be made of the operation of the inventive system with reference to FIGS. 2A to 10.

Normal Mode

The pulse number data obtainable per unit time period (one second) from the OR gate 113 is applied to the multiplication circuits 309 and 310. On the other hand, the subtraction circuit 301 receives the outputs from the OR gates 113 and 213 to make subtraction operation therebetween and the resultant difference output is applied to the addition/subtraction circuit 303. The addition/subtraction circuit 303 also receives the correction signal output from the AND gate 511, if any, so that the correction signal is added to or subtracted from the said difference output from the subtraction circuit 301, thereby to provide the corrected difference output of the number of pulses associated with the moving directional angle. The sine circuit 307 receives the output from the register 306, which stores the data transferred from the addition/subtraction circuit 303 through the AND gate 304 and the OR gate 305, and converts it to the moving directional angle, whereby the sine value of the angle is evaluated and is applied to the multiplication circuit 309. The cosine circuit 308 receives the output from the register 306 which stores the data transferred form the addition/subtraction circuit 303 through the AND gate 304 and OR gate 305 and converts it to the moving directional angle whereby the cosine value of the angle is evaluated and is applied to the multiplication circuit 310.

The multiplication circuit 309 evaluates the moving distance per unit time period based upon the data obtained from the OR gate 313, i.e. the number of pulses obtainable from the pulse generator 101 per unit time period and multiplies the resultant moving distance by the said sine value, thereby to provide the code signal indicative of the Y-axis component (Y1 in FIG. 10) of the X-Y recorder 605 in FIG. 4. Similarly, the multiplication circuit 310 evaluates the moving distance per unit time period and multiplies the resultant moving distance by the said cosine value, thereby to provide the code signal indicative of the X-axis component (X1 in FIG. 10) of the X-Y recorder 605.

The accumulator 311 receives the Y-axis component code signal from the multiplication circuit 309 and accumulates the Y-axis components inputted in succession, while the accumulator 313 accumulates the X-axis components similarly. Assuming that the code signals X1 and Y1 in FIG. 10 are inputted for the first time, the code signals X1 and Y1 are inputed to the D/A converters 601 and 602, respectively. Accordingly, the pen drive motors 603 and 604 for the respective axes are energized in response to the output from the D/A converters 601 and 602, respectively, and are driven in the reduced scale manner as defined as a function of the output from the amplifier 609 amplifying the signal indicative of the reduced scale such that the pen (not shown) is adapted to the reduced scale. Therefore, the X-Y recorder 605 plots the point P1 (in FIG. 10) on the map 606. Likewise, the values X2, Y2; X3, Y3; . . . are evaluated and are accumulated by the accumulators 313 and 311, respectively, in turn and accordingly the points P2, P3 . . . are plotted, thereby to draw the moving path in a polygonal line manner. It is pointed out that the difference in the distance between the points P1, P2 . . . is associated with the moving speed of the vehicle, so that the higher the speed the larger the distance and vice versa, as is readily understood from the fact that the number of pulses is counted per unit time period.

Check Mode

A check mode setting means 501 is provided for the purpose of correcting an error in the difference obtained from the subtraction circuit 301 while the vehicle is moving straight-forward caused by the imbalanced condition of paired wheels because of the imbalanced load condition or the swell of the tire on the wheels by the pressure of the compressed air therein. When the check mode setting means 501 is depressed, a flip-flop 502 is set and the latch circuit 508 in which the data loaded in the preceding check mode is cleared. Since the AND gate 503 is enabled by the set output of the flip-flop 502, the average value output from the average value circuit 302 (the moving distance factor) is allowed to be applied to the counter 504 through the AND gate 503. The counter 504 receives the output from the average value circuit 302 and provides a count up output when its count is a predetermined number of pulses, say 20,000 for the predetermined moving distance of say 200 meters. The flip-flop 502 is reset by the count up output from the counter 504 and the latch circuit 508 and the delay circuit 507 are triggered, so that the AND gate 511 is enabled. Accordingly, the latch circuit 508 receives the difference value from the subtraction circuit 301 and holds it.

The counter 505 counts the output from the average value circuit 302 and, each time the counter 505 counts the number of pulses, say 100, corresponding to one rotation of the wheels RW1 and RW2, a count up output is obtained to trigger the shift clock signal generator 506. Therefore, the shift clock signal generator 506 generates a certain number of clock signals per each complete rotation of the wheels, which is applied to the parallel-series converter 509 as a read out timing signal. Correspondingly, the parallel-series converter 508 receiving the output from the latch circuit 508 applies the said difference output in terms of the bit serial code signal to the frequency divider 510 as a function of the shift clock signal, i.e. per each rotation of the wheels. The frequency divider 510 of the embodiment shown frequency divides the signals to 1/100, which frequency divided output is applied to the AND gate 511 which has been enabled by the output from the delay circuit 507. Therefore, the addition/subtraction circuit 303 receives the output from the frequency divider 510, through the AND gate 511. The addition/subtraction circuit 303 makes addition or subtraction of the corrected number of pulses obtainable per each rotation of the wheels from the AND gate 511 and the number of pulses associated with the moving directional angle obtainable from the subtraction circuit 301. The output from the addition/subtraction circuit 301 comprises the number of pulses of the difference between the wheels RW1 and RW2 indicative of the moving directional angle as compensated for the errors of the moving direction caused by the imbalance of both wheels due to the imbalance of the load to both wheels and for the imbalance of the air pressure in the tires of the wheels. Thus, upon enabling of the check mode circuit, the moving directional angle as compensated for the errors is stored in the register 306, with the result that the position to be plotted on the map 606 by the X-Y recorder 605 is corrected.

Correction Mode 1

Now consider a situation where the vehicle moves along the road as shown in FIG. 5 and the receiver 402 borne on the vehicle receives the wave from the transmitter 701C in the area AR in FIG. 5 (or other transmitter). Then, the receiver 402 provides the latitude information and the longitude information of the inherent absolute position of the area AR, and the monostable multivibrator 403 is triggered. The output from the monostable multivibrator 403 is applied to the OR gate 403'. Therefore, the AND gate 403 is inhibited by the inversion of the output from the OR gate 403, and the output from the addition/subtraction circuit 303, i.e. the moving directional infromation evaluated of the movement of the vehicle, is inhibited form being inputted.

On the other hand, the accumulators 311 and 313 receive the latitude signal and the longitude signal, respectively, from the receiver 402. The accumulator 311 provides the accumulated value Ym of the Y-axis component based upon the latitude signal, irrespective of the output from the multiplication circuit 309, while the accumulator 313 provides the accumulated value Xm of the X-axis component based upon the longitude signal, irrespective of the output from the multiplication circuit 310. Therefore, the said absolute position is forcibly plotted on the map 606 of the X-Y recorder 605.

Correction Mode 2

When the vehicle is moving along a road of which the direction is known in advance, the setting switch 405 is manually set or the setting switch 405 is automatically set by an azimuth signal from the azimuth determination circuit 404 receiving a unique identification signal from the transmitter 701. The pulse number signal indicative of the directional angle obtainable from the azimuth signal generator 406 is applied to the OR gate 305.

At that time, another input to the OR gate 305, i.e. the output from the AND gate 304, has been inhibited by the inversion of the output of the OR gate 403'. Therefore, the register 306 receives only the pulse number signal indicative of the directional angle from the azimuth signal generator 406. Accordingly, the sine circuit 307 and the cosine circuit 308 evaluate the sine value and the cosine value, respectively, based upon the output from the register 306, i.e. the output from the azimuth signal generator 406. For example, assuming that the switch 405N for the north N is turned on and the pulse number signal indicative of the "0" from the azimuth signal generator 406N of the generator 406 is provided, the signal indicative of "0°" is forcibly loaded, even if a different pulse number signal had been provided by the addition/subtraction circuit 303 indicative of somewhat different angle. Therefore, when the switch 405N for the north N is turned on, the sine circuit 307 and the cosine circuit 308 evaluate the sine value and the cosine value, respectively, based upon the corrected "0°". The said "Correction Mode 2" can be effectively carried out in the case where the direction change is relatively little as in the case of a highway.

The code signal from the accumulators 311 and 313 may be transmitted, as necessary, through the transmitter 407 and the antenna 408, to a central monitor apparatus, such as a control tower of an airport, a control center for taxis or a demand bus, a traffic information center of the police, or the like, so that the vehicles can be controlled for movement thereof.

The features, advantages, and aspects of the embodiment shown, and described in the foregoing are depicted in the following.

(1) Since a certain number of pulses are adapted to be generated in response to one rotation of the wheels of the vehicle, to detect the rotation of the wheels in terms of the number of pulses, fine and accurate recording of the moving path of the vehicle can be made.

(2) Since the check circuit is provided for correction of the error caused by imbalance of both the left and right wheels during the movement of the vehicle in the straightforward direction, the moving directional angle is corrected, thereby to achieve more accurate recording.

(3) Since the receiver is provided for forcibly plotting the point based upon the data concerning the geographical absolute position, the absolute position of the vehicle can be recorded thereby and movement in the wrong direction can be prevented.

(4) Since the receiver, the azimuth determination circuit, the azimuth signal generator, the setting switch and the like are provided for forcible correction of the moving direction (azimuth), the moving direction of the vehicle is forcibly corrected depending upon the direction of the road where the vehicle is moving, thereby to achieve more accurate recording.

(5) If the code signal of the positional information of the vehicle is transmitted to the central monitor apparatus from the moving vehicle, automatic control of the movement of the vehicle can be achieved. Since the transmission to the central monitor apparatus is carried out by a code signal, the transmission is possible using a narrow frequency band.

Figure 11:
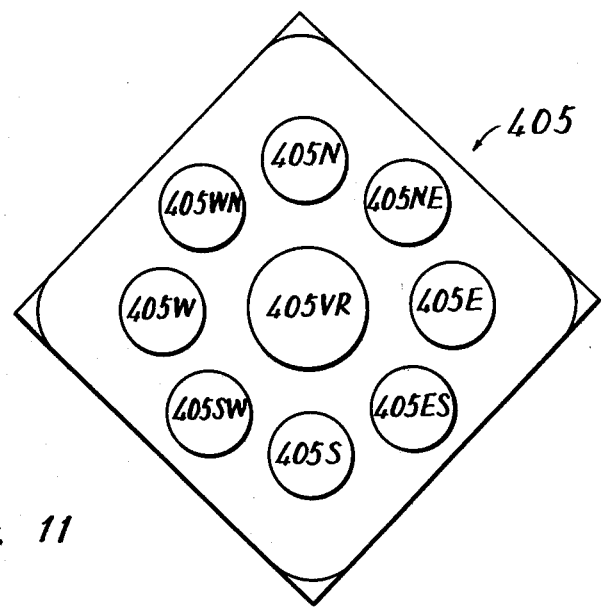
FIG. 11 is a diagrammatical plan view of a preferred embodiment of the direction setting switch 405 for use in the inventive system.
Figure 12:
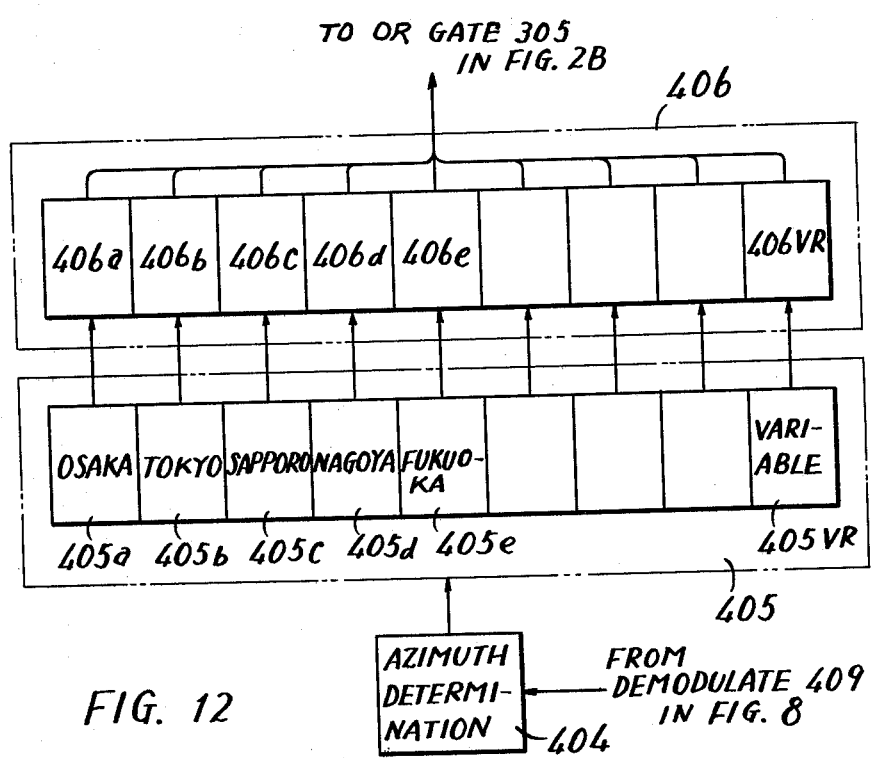
FIG. 12 is an illustration of a modified example of the FIG. 9 embodiment.

FIG. 11 is a diagrammatical view of a preferred embodiment of the setting switch 405 of the present invention. Since the setting switch 405 shown has been structured in a general square form, the driver of the vehicle can readily discriminate, each of the switches 405N, 405NE, 405E, 405SE, 405S, 405SW, and 405W, without a look at the arrangement of the individual switches in the switch 405. In the foregoing embodiment, the setting switch 405 was so structured to designate particular directions such as the north N, the east E and the like for the purpose of setting various predetermined directions. In case where the inventive apparatus is borne on an aircraft, however, an alternative arrangement as shown in FIG. 12 may be used. More specifically, a runway of the airport extends in the direction known in advance and the airplane runs usually along the runway. Therefore, the setting switch 405 shown in FIG. 12 has been adapted such that several individual setting switches are provided for each of the airports. Thus, the setting switch 405 shown in FIG. 12 comprises a switch 405a for setting the direction of the runway of the Osaka International Airport, a switch 405b for setting the direction of the direction of the runway of the Tokyo International Airport, a switch 405c for setting that of Sapporo, a switch 405d for setting that of Nagoya, a switch 405e for setting that of Fukuoka, and so on, and in addition a variable switch 405VR. Therefore, if and when the switch 405a is turned on, the signal generator 406a corresponding to the azimuth signal generator 406 generates an angle signal indicative of the direction of the runway of the Osaka International Airport. As a result, the contents in the register 306 are forcibly corrected so as to be the correct moving direction based upon the angle signal peculiar to the airport. The embodiment shown in FIG. 12 is advantageous in case where the inventive apparatus is borne on the aircraft for the purpose of correction of the direction.

Figure 13A:
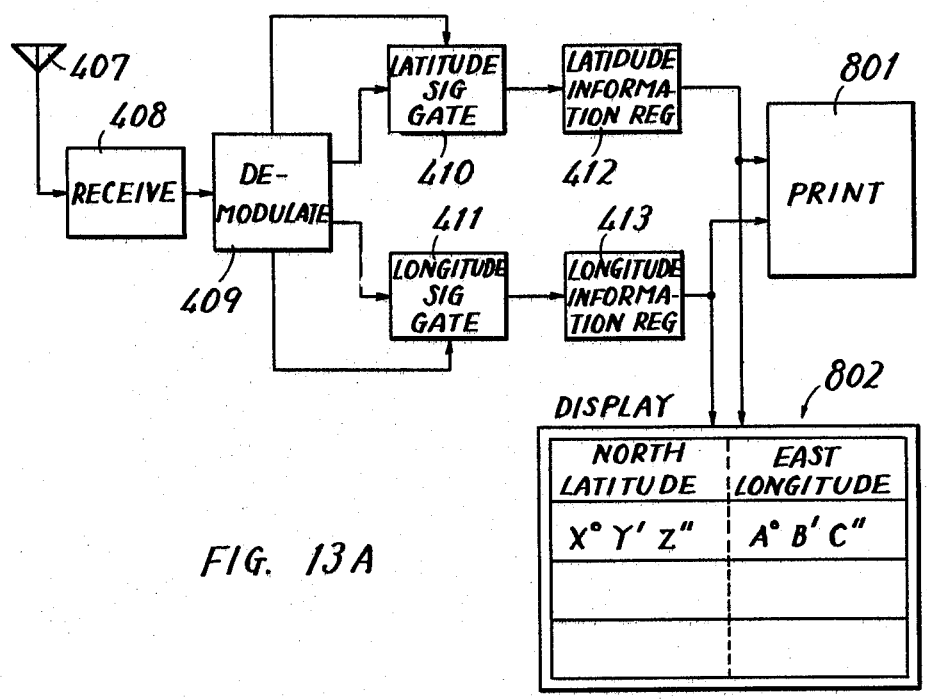
FIG. 13A is a block diagram of an embodiment of the inventive system.
Figure 13B:
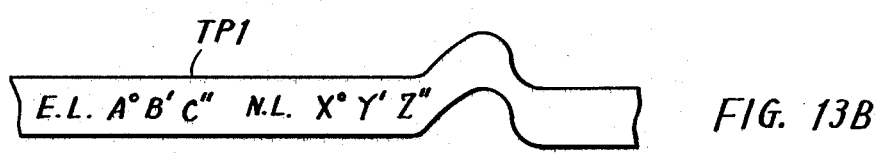
FIG. 13B is an illustration of an example of a print out on a paper tape obtainable by the FIG. 13A embodiment.

FIG. 13A is a block diagram of a preferred embodiment of the receiver for use in the inventive system. The latitude and the longitude information signals from the transmitter 701 (FIG. 6) are received through the receiving antenna 407 and, after these are amplified and wave processed by the suitable amplifiers and the wave shaping circuits in the receiving circuit 408, applied to the demodulator 409. The demodulated latitude information signal 11 from the demodulator 409 is loaded in the latitude information register 412 through the latitude signal gate 410 which is enabled by the latitude setting signal 10. On the other hand, the demodulated longitudinal information signal 21 from the demodulator 409 is loaded in the longitude information register 413 through the longitude signal gate 411 which has been enabled by the longitude setting signal 20. When the respective digital information signals are stored in the respective registers 412 and 413, the transmission end signal 30 is obtained from the demodulator 409. The transmission end signal 30 enables the said registers 412 and 413 to transfer the latitude information signal and the longitude information signal stored therein to the printing apparatus 801. Accordingly, the printer 801 prints out on the tape TP1 the latitude information and the longitude information stored in the registers 412 and 413, respectively, as shown in FIG. 13B.

If desired, the latitude information and the longitude information stored in the registers 412 and 413 may be displayed by means of a display 802 comprising display devices such as a liquid crystal device, a light emitting diodes, or the like. In the embodiment shown, the display 802 has been adapted to be capable of displaying the X-axis (longitude) and the Y-axis (latitude) information as for four positions, so that the oldest positional information is cleared each time the latest positional information is received. If desired, the embodiment may comprise a provision for avoiding receipt of the same signal in succession so that the preceding information may not be cleared in such a situation where the vehicle stays in the same place for so many hours where the continued receipt of the same signal could clear the information received previously in a different place.

In operation, assuming that the area AR1 is located at A°B'C" of the east longitude and X°Y'Z" of the north latitude, the transmitter provided at the area AR1 as shown in FIG. 6 transmits the code signal comprising such numerical information as shown in FIG. 7B. Accordingly, when the vehicle (automobile) bearing the receiver as shown in FIG. 13A reaches the area AR1, such code signal is received. Therefore, the code signal of X°Y'Z" of the north latitude is loaded in the register 412 and A°B'C" of the east longitude is loaded in the register 413. Correspondingly, the printer 801 prints out the positional information concerning the said area AR1 in the recording format as shown in FIG. 13B. When the vehicle moves to the area AR2, a printer 801 similarly prints out the positional information concerning the area AR2. Thus, the path the vehicle passed is print out in succession on the paper tape TP1.

According to the foregoing embodiment, the following advantages will result. The printer for printing out a moving path may be of a simple type, so that the receiver may be made small sized. Since the points the vehicle passes are recorded in succession, the moving path of the vehicle is readily known.

If desired, a timing mechanism such as a timer may be provided in the receiver, whereby the time of passing the point is additionally printed out. If desired, further information showing vacancy of the taxi for example, may be recorded additionally, whereby the moving path of the taxi in vacancy is printed out for the purpose of obtaining management data for a taxi company.

Figure 14B:
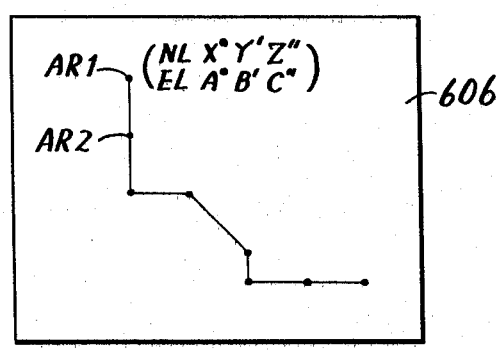
FIG. 14B is an illustration for showing the recorded matter on a map by the FIG. 14A embodiment.

FIG. 14A is a block diagram of a data processing apparatus of a preferred embodiment for use in the inventive system. The embodiment shown is aimed to plot the moving path of the vehicle on the map particularly prepared based upon the data of the tape TP1 printed out of the successive passing positions. The embodiment shown may be advantageously employed by a taxi company, a forwarding agent, and the like. The tape TP1 printed out of the numerals (passing points) undergoes reading out by a reader 803, such as an optical reader or the like, whereby the latitude information and the longitude information of the said area are read out.

The latitude information read out by the reader 803 is applied to a signal converter 601' and the longitude information read out by the reader 803 is applied to a signal converter 602'. These converters 601' and 602' provide the analog voltage output corresponding to the respective information pieces, which are applied to the pen drive motors 603 and 604, respectively, as drive control signals. These motors 603 and 604 are provided for the purpose of moving the pen (not shown) of the X-Y recorder 605, such that the pen is driven by the motor 603 in the longitude direction (X-axis direction) and by the motor 604 in the latitude direction (Y-axis direction). The pen is adapted such that the point defined by the above descirbed numerical information is plotted on the map 606 particularly prepared and mounted on the X-Y recorder 605. As described previously, the map 606 is particularly prepared as a recording medium so as to be adapted for the X-Y recorder 605. The map 606 comprises the reduced scale indication 607, which is read out by the reduced scale indication reader 608 and is amplified by the amplifier 609, the output of which is applied to the converters 601' and 602', whereby the X-Y recorder 605 is automatically made adaptable for the reduced scale of the recording medium upon mounting of the map 606 on the X-Y recorder 605, as previously described with reference to FIG. 4.

In operation, assuming that the positional information concerning the areas AR1, AR2 . . . has been printed in succession on the paper tape TP1, the corresponding positional information signal concerning the areas AR1 (A°B'C" of the east longitude and X°Y'Z" of the north latitude), AR2 . . . is outputted from the reader 803. The longitude positional information signal such as A°B'C" for the area AR1 is applied to the signal converter 602' and the latitude positional information signal is applied to the signal converter 601'. As a result the voltage outputs associated with these numerical information pieces are obtained from these converters 602' and 601' and applied to the motors 604 and 603. As a result, the pen (not shown) is driven in the X direction (longitude direction) and the Y direction (latitude direction) in a proportional association (as adapted for the said reduced scale) with the analog voltage value obtainable from the converters 602' and 601', while the points corresponding to these areas AR1, AR2 . . . are plotted in a polygonal line manner. Accordingly, the moving path of the vehicle bearing the receiver is drawn in a polygonal line manner on the map 606.

If and when the position of a certain transmitter is known in advance in the embodiment shown, initial setting may be effected so as to initially set the recording pen to the position on the map corresponding to the transmitter. The embodiment may be modified as set forth in the following, if desired. A certain machine readable code is recorded in advance on the map. If and when the read output of the code and the output of the code and the output from the reader 803 coincide with each other, the recording pen is driven accordingly. Alternatively, the output from the reader 803 is enabled to be driven only if and when the read output of the said code is included in the output from the reader 803.

According to the above described embodiment, the data concerning the points where the vehicle passed which were printed out by way of the numerical information are recorded in the form of the moving path of the vehicle on the map, thereby to facilitate understanding of the moving path. Such a data processor can be provided at a taxi company, forwarding agent and the like for the purpose of preparing data concerning the moving path based upon the tape as recorded by the receiver (FIG. 13) borne in the vehicle. Such a data processor may alternatively be provided at busy places such as a terminal station of the railroad, or the like so as to allow anyone to utilize the processor whenever he desires.

FIG. 15A is a block diagram of another preferred embodiment of the data processor for use in the inventive system. The embodiment shown is aimed to print out the name of the places where the vehicle passed based upon the print out tape TP1. The tape TP1 printed out of the said numerical information concerning the places where the vehicle passed is set on the reader 803, such as an optical reader. As a result the latitude information and the longitude information concerning the above descirbed areas are read out by the reader 803 and are applied to a decoder 804. The decoder 804 serves to decode the name of the places or the areas based upon the above described information. Assuming that the name of the area AR1 of A°B'C" of the east longitude and X°Y'Z" of the north latitude is a "X-street intersection", the printer 805 is controlled such that it prints out the letters "X-street intersection" on the tape TP2. As a result the name of the name of the places where the vehicle passed is printed out in the letters, thereby to better fascilitate understanding of the place of location.

FIG. 16A shows a recording format of a tape of another embodiment for use in the inventive system. In the embodiment shown, a code or symbol specifying the areas is in advance assigned in terms of the alphabet, for example, and the digital signal indicative of the code is transmitted by the transmitter of FIG. 6. Therefore, the places where the vehicle passed are printed out in terms of the above described characters, as shown in FIG. 16A, on the tape TP1 based upon the data received by the receiver of FIG. 13A. Alternatively, such code indicative of the places may be printed out on the tape TP2 based upon the numerical information obtained by the data processor shown in FIG. 15A. Such embodiment shown is particularly advantageous in a particular application where the moving path of the vehicle is restricted, such as a patrol car of the police or a demand bus.

FIG. 16B shows still another example of the recording format of the tape for use in the inventive system. In the embodiment shown, the respective areas AR1, AR2 ... of FIG. 5 are individually identified in terms of the name or the number of the street and the avenue constituting the respective intersections. Therefore, the transmitter of FIG. 6 is adapted to transmit the numerical information such as 1" × 25" standing for the intersection of the Route No. 1 and the Route NO. 25. As a result, the tape TP1 printed out of the areas comprises a combination of the numerals each identifying the number of routes for constituting the place where the vehicle passed. The tape TP2 may be printed out by means of the data processor as shown in FIG. 15A.

The output of the data processor may be displayed by using a well known plasma display, a cathode ray tube and the like instead of printing out on the map or the tape.

According to the above described embodiments, no recorder is provided in the vehicle and therefore the receiver borne on the vehicle may be small sized and simple in structure, with the result that a moving path information processing system easy of operation can be provided.

Figure 17A:
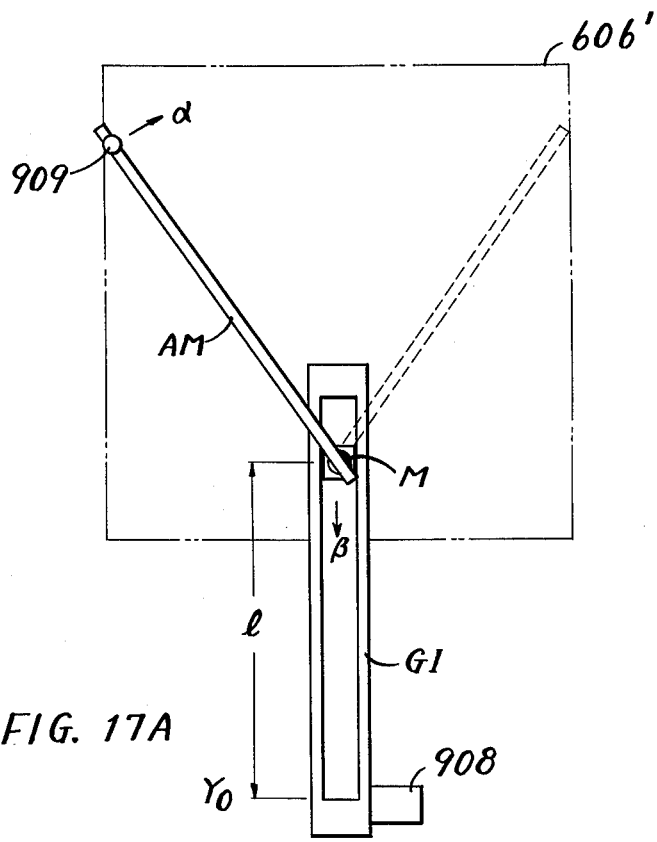
FIGS. 17A, 17B and 17C show a plan view, a left side view, partially in section, and a rear view of a scanning means of an embodiment to be employed in the inventive system.
Figures 17B, 17C:
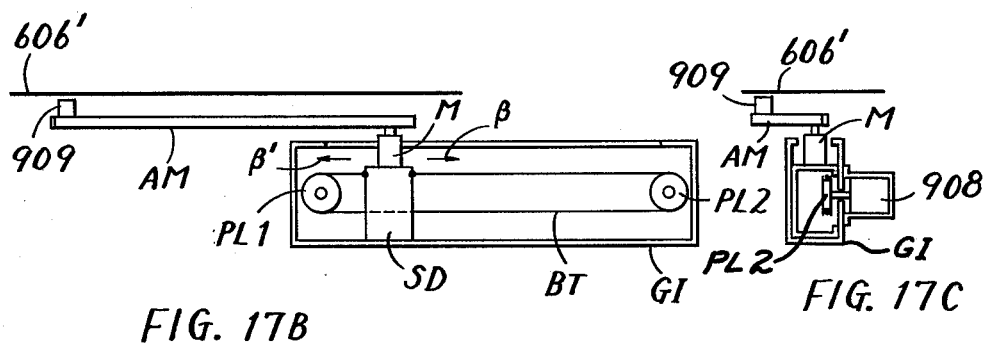

FIGS. 17A, 17B and 17C illustrate a plan view, a left side view and a rear view of a co-ordinate display apparatus advantageously used in the inventive system. Pulleys PL1 and PL2 are rotatably mounted on a guide GI. The shaft of the pulley PL1 (or PL2) is coupled to the shaft of a first motor 908. A belt BT is provided between the pulleys PL1 and PL2, such that one end and the other end of the belt BT are fixed to a sliding member SD. Therefore, the rotation of the first motor 908 is transmitted to the pulley PL1, which transfers the belt accordingly, whereby the sliding member SD is slid between the pulleys PL1 and PL2. A means, such as a potentiometer (not shown), for detecting the position (the position on the Y-axis) of the sliding member SD sliding between the pulleys PL1 and PL2 is provided in association with the sliding member SD.

A second motor M is mounted on the said sliding member SD and one end of the arm AM is journalled by the shaft of the motor M. An indicator 909 (or a thermal pen or the like) is provided on the other end of the arm AM. Accordingly, when the arm AM is rotated by the rotation of the second motor, the indicator 909 provided on the other end of the arm AM is caused to scan a subsequently described map 606'. A means, such as a resolver (not shown) for detecting a rotational angle $\theta$ of the arm AM is provided in association with the second motor AM. Preferably, the rotational angle ($\theta$) of the arm AM is adapted to be detected only during the time when the map 606' is scanned by the indicator 909 of the arm AM.

The map 606' to be provided to be scanned by the indicator 909 is particularly prepared on a reduced scale such as for each of the specific regions. For example, the map may comprise a transparent film on which the map is shown. Alternatively, the map may comprise a recording sheet sensitive to the light emission of the indicator 909 so as to enable light recording. An alternative map may comprise a recording sheet sensitive to the heat given by a thermal pen which is substituted for the indicator 909.

Figure 18:
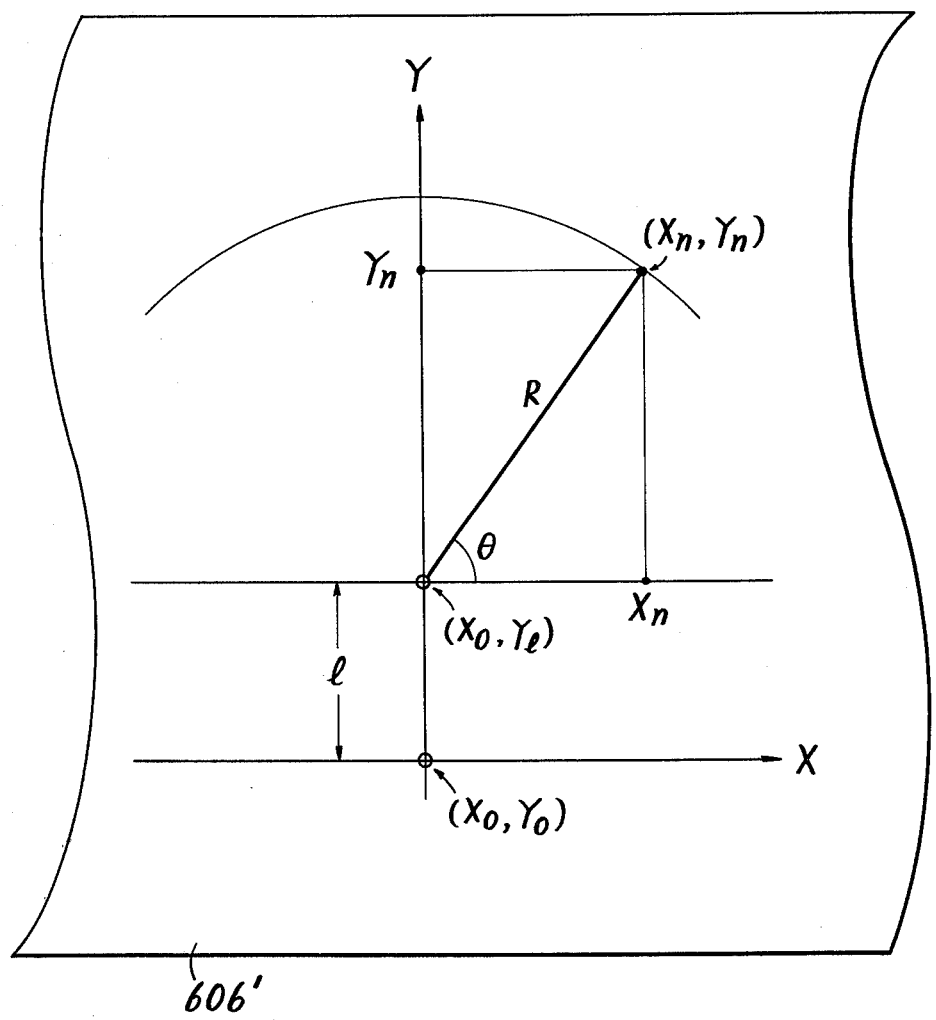
FIG. 18 shows an illustration of a map 606' to be employed in the FIG. 17 embodiment.

FIG. 18 is a geometrical illustration of the co-ordinates for showing the scanning by the indicator 909 on the map 606'. Assume that an extreme position in which the sliding member SD of the co-ordinate display apparatus has been slid in the guide GI toward the pulley PL2 in the arrow $\beta$ direction is the original point ($X_0$, $Y_0$), the co-ordinate position of the rotational center of the arm AM when the sliding member SD has been slid by the moving distance L along the Y-axis from the original point toward the pulley PL1 in the arrow $\beta'$ direction is ($X_0$, $Y_1$), the lengths of the arm AM from the rotational center or the supporting axis to the indicator 909 is R, and the rotational angle of the arm AM as detected by the resolver is $\theta$, then the co-ordinate position ($Xn$, $Yn$) of the indicator 909 may be expressed by the following equations.

$$Xn = R\cos \theta \quad (1)$$

$$Yn = R\sin \theta + Yl$$

Figure 19:
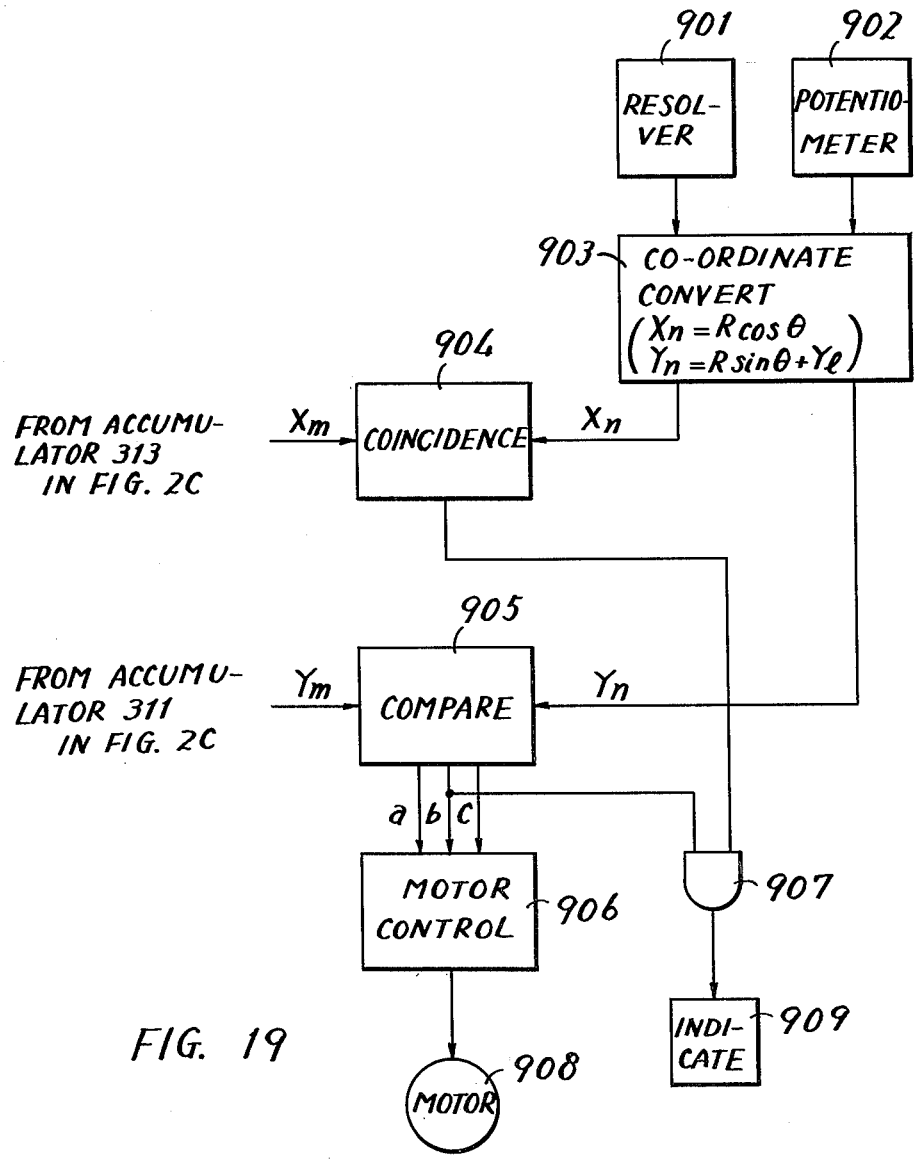
FIG. 19 is a block diagram of an electrical connection of the FIG. 17 embodiment.

FIG. 19 illustrates an embodiment of the co-ordinate position display control 600 for use in the inventive system. The co-ordinate position display control 600 comprises a resolver 901 and a potentiometer 902 for detecting a scanning position on the map by means of the indicator 909, the co-ordinate conversion circuit 903 for converting the outputs from the resolver 901 and potentiometer 902 to the co-ordinate position signal, a coincidence circuit 904 and a compare circuit 905 for comparing the output Xn, Yn from the co-ordinate conversion circuit 903 and the outputs Xm, Ym from the accumulators 311 and 313 in FIG. 2C, a motor 908 and a motor control 906 for driving in response to the output from the compare circuit 905 the said sliding member SD and thus the indicator in the Y-axis direction, and the indicator 909 for indicating the coincidence of the detected position of the vehicle and the scanning position.

Now, description will be made of the operation of the embodiment shown with reference to FIGS. 17A to 19. The positional signal output Ym for the Y-axis factor obtainable from the accumulator 311 is applied to the said compare circuit 905. Since the said arm AM of the co-ordinate display apparatus 600 is normally driven by the second motor M, the indicator 909 provided at the free end of the arm AM is caused to scan in succession the surface of the map 606' particularly prepared as described above. The resolver 901 detects the rotational angle $\theta$ of the arm AM, which is applied to the co-ordinate conversion circuit 903. On the other hand, the potentiometer 902 detects the distance L from the original point of the sliding member SD, which is also applied to the co-ordinate conversion circuit 903. The co-ordinate conversion circuit 903 serves to convert the incoming signals $\theta$ and $l$ into the signal of the co-ordinate position (Xn, Yn) of the indicator 909, as shown in equation (1). The positional signal output Xn for the X-axis factor from the co-ordinate conversion circuit 903 is applied to the coincidence circuit 904 and the positional signal output Yn for the Y-axis factor from the co-ordinate conversion circuit 903 is applied to the compare circuit 905.

The coincidence circuit 904 serves to compare the positional signal Xm of the vehicle obtainable from the co-ordinate conversion circuit 904. More specifically, the coincidence circuit 904 compares the co-ordinate position of the vehicle on the X-axis and the co-ordinate position of the indicator 909 and provides a coincidence output of the high level to one input of the AND gate 907 when both coincide with each other.

The compare circuit 905 serves to compare the positional signal Ym of the vehicle obtainable from the accumulator 311 and the positional signal Yn obtainable from the co-ordinate conversion circuit 903. More specifically, the compare circuit 905 compares the co-ordinate position of the vehicle on the Y-axis and the co-ordinate position of the indicator 909, and provides a reverse rotation instructing signal "a" when the positional signal Ym is larger than the positional signal Yn(Ym > Yn), the stop instructing signal "b" when the positional signals Ym and Yn are equal, and a forward rotation instructing signal "c" when the positional signal Ym is smaller than the positional signal Yn (Ym < Yn), these instructing signals being applied to the motor control 906.

If and when the reverse rotation instructing signal "a" is applied to the control 906, for example, i.e. the co-ordinate position of the vehicle on the Y-axis is larger than the co-ordinate position of the indicator 909, the first motor is reverse rotated by the control 906, whereby the sliding member SD is slid in the arrow $\beta$ direction. If and when the forward rotation instructing signal c is applied to the cntrol 906, the first motor 901 is forward rotated by the control 906, whereby the sliding member SD is slid in the arrow $\beta'$ direction. When the sliding member SD is slid in the arrow $\beta$ direction or arrow $\beta'$ direction, the indicator 909 is moved in association therewith. When the co-ordinate position of the vehicle on the Y-axis and the co-ordinate position of the indicator 909 coinside with each other (Ym = Yn), the stop instructing signal $b$ is applied to the motor control 906 from the compare circuit 905. Accordingly, the first motor 901 is stopped by the motor control 906. At that time, the stop instructing signal $b$ from the compare circuit 905 is applied to the other input of the AND gate 907. The AND gate 907 is enabled by application of the coincident output from the coincidence circuit 904 and the stop instructing signal $b$ from the compare circuit 905 and the output from the AND gate 907 is applied to the indicator 909. As a result, the indicator 909 is lit to indicate the coincidence, when the co-ordinate position (Xm, Ym) obtainable from the accumulators 313 and 311 and the co-ordinate position (Xn, Yn) of the indicator 909 coincide with each other, whereby the present position of the vehicle is indicated on the map 606' particularly prepared. Since the indicator 909 continues to scan the map 606', visual indication by the indicator 909 is provided only the instant the co-ordinate positions (Xm, Ym) and (Xn, Yn) coincide with each other, with the result that only one point indication is seen on the map 606'. If high speed scanning is made by the indicator 909, as necessary, continued indication of the point corresponding to the position of the vehicle can be made on the map 606' through an after image effect. A noteworthy aspect of the above described embodiment is that comparison is made of the co-ordinate positional information of the indicator 909 scanning the map 606' and the co-ordinate positional information obtained by evaluation of the pulses generated by the moving vehicle and the present position of the vehicle is indicated on the map in response to the coincidence thereof.

According to the above described embodiment, the following advantages will be achieved.

(1) Since comparison is made of the co-ordinate position of the indicator scanning the map and the co-ordinate position of the vehicle by measurement and evaluation and indication is made of the position of the vehicle in response to the coincidence thereof, the position of the moving vehicle can be accurately known with a relatively simplified structure.

(2) The position of the moving vehicle is indicated without using an expensive XY recorder, with the result that a small sized and inexpensive apparatus for indicating the position of the moving vehicle is provided.

By way of an alternative embodiment, photosensitive recording may be effected using a light sensitive map. Instead of a light sensitive map, a heat sensitive map may be used such that recording is made with a thermal, pen or the like. If a map is made of a magnetic sheet which is heat sensitive, a combination of a magnetic head and a thermal pen is used instead of the indicator 909, whereby the position of the moving vehicle is magnetically recorded and at the same time thermally recorded, which enables human visual observation and machine reading of the data. Such a record can be preserved by way of a recording of the moving path of the vehicles, and particularly advantageously utilized by a taxi company, forwarding agent and the like.

In the above described embodiment, the indicator 909 was enabled only during the scanning period while the indicator 909 was moved in the Y-axis direction. Alternatively, however the indicator 909 may be enabled throughout the full rotation angle (360°) for indication of the scanning period, while the length R of the arm AM is varied. By way of a further modification, a cathode ray tube may be used in view of the co-ordinate display apparatus, upon which a map indicating film is mounted, thereby to indicate the position of the vehicle thereon. In such a case, the output from the coincidence circuit CI is applied to the cathode ray tube as an X-axis factor, while the output from the compare circuit 905 is applied to the cathode ray tube as a Y-axis factor, whereby the point corresponding to the intersection of the X-axis factor and the Y-axis factor is indicated as a change in the brightness thereof.

In the foregoing, the co-ordinate display apparatus was described as comprising a prime mover (the second motor M) for rotation of the arm AM and a prime mover (the first motor 908) for driving the sliding member SD in the Y-axis direction, which are provided separately. However, a common prime mover may be used by combining with proper transmission means, such as pulleys, belts, gear mechanisms, and the like.

The above described embodiment provides a co-ordinate position display apparatus capable of displaying the co-ordinate position of the vehicle accurately on a recording medium such as a map, which is implemented in a relatively simple and inexpensive structure.

In the following, a further embodiment of the present invention will be described. Before entering into the details thereof, however, an outline of the embodiment to be described in the following comprises a means for detecting the moving distance and direction of the vehicle, such as an automobile, which is running along a desired path thereof, wherein the positional information on the co-ordinates of the vehicle is obtained on the basis of the output from the means for detecting the moving distance and direction. In addition, the embodiment comprises a path recording means in which a path to be traced by the vehicle has been recorded in advance, and means for providing a scanning positional information by scanning of the path, whereby in response to the co-ordinate positional information of the vehicle and the said scanning positional information the distance and the azimuth from the co-ordinate position of the vehicle to the scanning position are evaluated, thereby to notify the azimuth to be followed in order to move along the said desired path.

Figure 20:
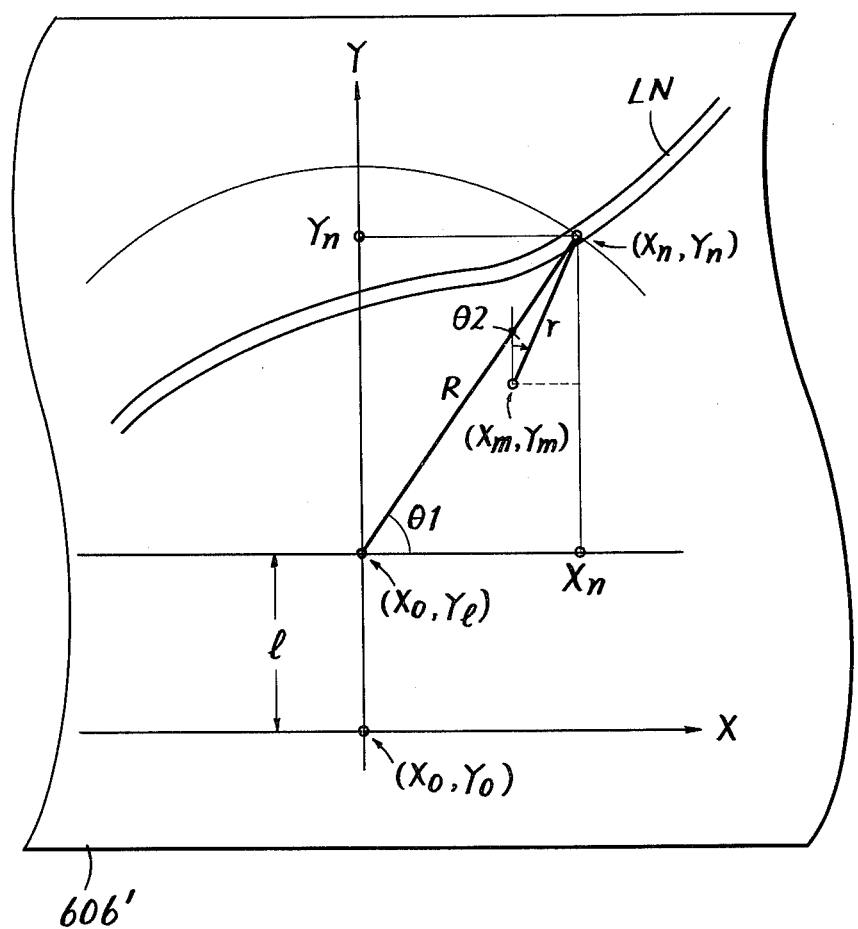
FIG. 20 shows an illustration of the map 606' drawn by another embodiment to be employed in the inventive system.

FIG. 20 is a geometrical illustration for explanation of the concept of the present embodiment. On a path recording means, such as a map 606' on which the path LM to be traced by the vehicle is recorded in advance, the co-ordinate position (Xm, Ym) of the present position of the vehicle and the co-ordinate position (Xm, Ym) on the path LN are shown. The present position (Xm, Ym) is shown on the map 606' in accordance with the actual movement of the vehicle and the co-ordinate position (Xn, Yn) on the path is detected by the scanning apparatus, as to be more fully described subsequently. Referring to FIG. 20, the distance $r$ from the present position (Xm, Ym) to the position on the path (Xn, Yn) may be expressed as equation (2).

$$r = \sqrt{(Xn - Xm)^2 + (Yn - Ym)^2} \quad (2)$$

On the other hand, the angle $\theta 2$ between the Y-axis direction, i.e. the north direction as a reference line and the direction from the present position to the co-ordinate position may be expressed as $$\theta 2 = \cos^{-1} \frac{(Yn - Ym)}{r} \quad (3)$$

or $$\theta 2 = \sin^{-1} \frac{(Xn - Xm)}{r} \quad (4)$$

Thus, by proper evaluation based on the present position and a co-ordinate position on the path, the azimuth from the present position toward the path can be obtained. With this concept of the present embodiment in mind, more detailed description will be made of a schematic diagram of the embodiment in the following.

Figure 21:
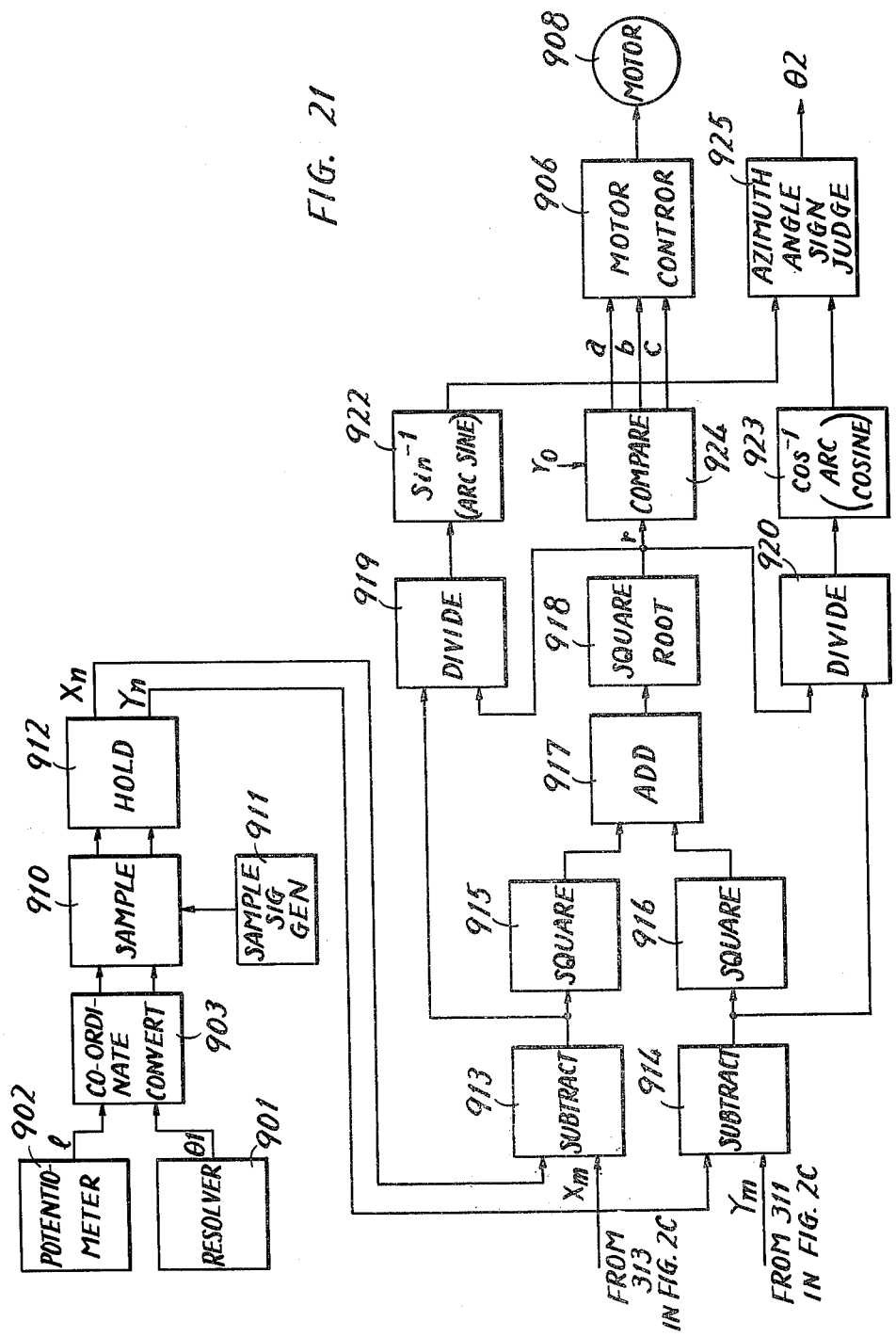
FIG. 21 is a block diagram of an electrical connection of the embodiment for drawing the map of FIG. 20.

FIG. 21 is a block diagram of an embodiment of the azimuth signal generating apparatus for use in the inventive system. The embodiment shown comprises a path recording means, such as a map for recording the path to be traced by the vehicle and a scanning apparatus, as shown in FIGS. 17A, 17B and 17C for scanning the path on the map. In the embodiment, let it be assumed that the extremity position of the sliding member SD of the co-ordinate display apparatus toward the pulley PL2 (in the arrow $\beta$ direction as slid along the guide GI) is the original point $(X_0, Y_0)$, the co-ordinate position of the supporting axis of the arm AM at the moving distance L on the Y-axis from the original point detected by the potentiometer when the sliding member SD is slid toward the pulley PL1 in the arrow $\beta'$ direction is $(X_0, Yl)$, the length from the supporting axis of the arm AM to the indicator 909 is R, and the rotation angle of the arm AM detected by the resolver is $\theta 1$. Then the co-ordinate position (Xn, Yn) of the indicator 909 may be expressed by the following equation (1)'.

$$Xn = R\cos \theta 1 \quad (1)'$$
$$Yn = R\sin \theta 1 + Y$$

Since the scanning positional information on the path is detected by the scanning apparatus, the said co-ordinate position (Xn, Yn) is handled in the following as a scanning positional information on the path.

Returning to FIG. 21, the rotation angle $\theta 1$ of the arm AM is detected by the resolver 901 and is applied to the co-ordinate conversion circuit 903. The moving distance $l$ of the sliding member SD is detected by the potentiometer 902 and is applied to the co-ordinate conversion circuit 903. The co-ordinate conversion circuit 903 evaluates the scanning position signal (Xn, Yn) based on the inputs $\theta 1$ and $l$, as shown in the equation (1)'. The scanning position signal (Xn, Yn) is sampled by the sampling circuit 910 and the sampled scanning position signal (Xn, Yn) is held by the holding circuit 912. The sampling signal for the said sampling circuit 910 is provided from the sampling signal generator 911. The scanning position signal Xn from the holding circuit 912 is applied to the first subtraction circuit 913 and the scanning position signal Yn is applied to the input of the second subtraction circuit 914. The other input of the subtraction circuit 913 is adapted to receive the output Xm of the X-axis factor from the accumulator 313 in FIG. 2C for providing the position signal on the co-ordinates of the vehicle. Likewise, the other input of the said subtraction circuit 914 is adapted to receive the output Ym of the Y-axis factor of the accumulator 311. The said subtraction circuit 913 makes subtraction of the signal Xn from the holding circuit 912 and the signal Xm from the accumulator 313 and the subtraction output |Xn − Xm| is applied to the subsequent first square circuit 915 and is also applied to the first division circuit 919 as a dividend. The output (Xn − Xm)² from the said first square circuit 915 and the output (Yn − Ym)² from the said second square circuit 916 are applied to the addition circuit 917, where both outputs are summed. The sum output from the addition circuit 917 is applied to the square root circuit 918, where the square root of the sum output is operated. The output r from the square root circuit 918 is applied to the compare circuit 924 and is compared with a preset value $r_0$ and is also applied to the first and second division circuits 919 and 920 as a divisor.

The said compare circuit 924 makes comparison of the square root r from the square root circuit 918 and the preset value $r_0$, and provides a reverse rotation instructing signal a when r is larger than $r_0(r > r_0)$, a stop instructing signal b when r is equal to $r_0(r = r_0)$, and a forward rotation instructing signal c when r is smaller than $r_0(r < r_0)$, these instructing signals being applied to the motor control 906. The motor control 906 is responsive to the instructing signal a, b, or c to control the driving of the said first motor 908.

The outputs from the first and second division circuits 919 and 920 are applied to the subsequent sine$^{-1}$ (arc sine) circuit 922 and the cos$^{-1}$ (arc cosine) circuit 923, respectively. The outputs from these sine$^{-1}$ circuit 922 and the cos$^{-1}$ circuit 923 are applied to the azimuth angle sign judging circuit 925 to provide the azimuth angle $\theta2$ from the co-ordinate position to the scanning position.

Referring to FIGS. 17A to 17C and 20, the operation of the FIG. 21 embodiment will be described. Since the said arm AM comprised in the scanning apparatus (FIGS. 17A, and 17B and 17C) provided in the co-ordinate display apparatus 600 is driven by the second motor M, the said position indicator 909 such as the thermal pen, mounted at the free end of the arm AM, scans the map 606'. The resolver 901 detects the rotation angle $\theta1$ of the arm AM and the potentiometer 902 detects the moving distance l of the sliding member SD, which are applied to the co-ordinate conversion circuit 903. The co-ordinate conversion circuit 903 converts the incoming data $\theta1$ and l into the signal (Xn, Yn) associated with the co-ordinate position of the position indicator 909. Thus, the signal (Xn, Yn) is obtained from time to time as the scanner scans the map 606'.

Now consider a case where the position indicator 909 of the scanner proceeds along the path Lm indicated in advance on the map 606'. In the instant of crossing a sampling signal is generated from the sampling signal generator 911 and the signal (Xn, Yn) obtained at that time is sampled by the sampling circuit 910, The sampled signal is held by the holding circuit 912. The held signal Xn is applied to the first subtraction circuit 913 and the held signal Yn is applied to the second subtraction circuit 914.

On the other hand, the accumulators 313 and 311 provide the co-ordinate position signal (Xm, Ym) of the vehicle on the co-ordinates, and the output Xm of the X-axis factor is applied to the first subtraction circuit 913 and the output Ym of the Y-axis component is applied to the second subtraction circuit 914. The subtraction results |Xn − Xm| and |Yn − Ym| from the subtraction circuits 913 and 914, respectively, are squared by the subsequent square circuits 915 and 916, respectively, thereby the subsequent square circuits 915 and 916, respectively, thereby to provide (Xn − Xm)² and (Yn − Ym)². These square results are summed by the addition circuit 917 to provide (Xn − Xm)² + (Yn − Ym)² and the result is square rooted by the square root circuit 918 to provide $\sqrt{(Xn − Xm)^2 + (Yn − Ym)^2}$ $(=r)$. It is seen that the result is the distance between the co-ordinate position of the vehicle and the scanning position on the path. The distance r is applied to the compare circuit 924 and is compared with the preset value $r_0$ and a suitable signal a, b or c is provided to the motor control 906 so as to make r smaller when r is larger than $r_0$ and to make r larger when r is smaller than $r_0$. Accordingly, the motor 908 is properly controlled by the motor control 906.

The outputs from the subtraction circuits 913 and 914 are applied to the corresponding subtraction circuits 919 and 920, respectively, as a dividend. On the other hand, the output r from the square root circuit 911 is applied to the division circuits 919 and 920 as a divisor. As a result, division result as shown as equation (5) is obtained from the first division circuit 919 and the division result as shown as equation (6) is obtained from the second division circuit 920.

$$\frac{Xn - Xm}{\sqrt{(Xn - Xm)^2 - (Yn - Ym)^2}} \quad (5)$$

$$\frac{Yn - Ym}{\sqrt{(Xn - Xm)^2 + (Yn - Ym)^2}} \quad (6)$$

The division result from the first division circuit 919 is applied to the sine$^{-1}$ circuit 922 and the division result from the second division circuit 920 is applied to cos$^{-1}$ circuit 923, thereby to evaluate the angle $\theta2$. The angle $\theta2$ thus obtained from the circuit 922 and 923 is applied to the azimuth angle sign judging circuit 925 where the sign of the angle is judged to provide the azimuth angle $\theta2$ including the sign. It is readily understood that if the preset value $r_0$ is made smaller in the compare circuit 924 the present position can be detected by the scanner. It is pointed out that the above described operation can be effected using a micro data processor.

FIG. 22 is a block diagram of a further preferred embodiment for use in the present inventive system. In the embodiment shown in FIG. 21, the scanner comprising the resolver 901 and the potentiometer 902 was utilized to scan the path Ln indicated in advance on the map 606' whereby the crossing point was detected to evaluate the co-ordinate position (Xn, Yn) on the path. By contrast, according to the embodiment shown in FIG. 22, a function generator 926 is utilized for generating a function signal (Y = F(X)) associated with a desired path Lm, thereby to evaluate the distance r between the two points based on the function signal corresponding to the co-ordinate position (Xn, Yn) on the said path Ln and the signal (Xm, Ym) from the accumulators 313 and 311. Accordingly, it is understood that the operation process in the FIG. 22 embodiment is substantially the same as that of the FIG. 21 embodiment. The difference is that the compare circuit 924 provides the high level output when r and $r_0$ coincide with each other to enable the subsequent AND gate 927. In response to the enabling of the AND gate 927, the azimuth angle $\theta2$ (as judged of the sign) is withdrawn as an azimuth signal. According to the FIG. 22 embodiment, the path information is not indicated on the map but is set as a function. Therefore, the desired path information can be selectively set with ease and display is possible on a cathode ray tube. The azimuthal indication is also displayed on the cathode ray tube, if desired. If desired, only the azimuth may be displayed on a separate means such as by way of a meter indication, an audio indication, or the like, without being displayed on the cathode ray tube. Alternatively, the azimuth may be stored in a memory by way of a recording of the path information.

In the above described embodiment, the azimuth signal to be directed by the vehicle such as the automobile, aircraft and the like is generated and displayed. Alternatively, however, if a walking distance is detected by a walking meter or the like and a sound concerning the azimuth is generated based on the azimuth signal, then a walking guide apparatus for the blind can be implemented. If a vehicle is steered automatically in accordance with the azimuth signal and an automatic fire extinguishing apparatus is borne on the vehicle, then an automatic extinguishing activity is possible without any danger of access by a fireman to the fire and a life rescue at the fire is also possible.

Although this invention has been described and illustrated in detail, it is to be clearly understood that the same is by way of illustration and example only and is not to be taken by way of limitation, the spirit and scope of this invention being limited only by the terms of the appended claims.

What is claimed is:

1. A system for processing positional information of a moving vehicle comprising paired first and second independently rotatable wheels provided at both sides of the moving direction of the vehicle, said system comprising:

first and second means independently and operatively coupled to said paired first and second wheels, respectively, for generating pulse signals in association with the rotation of said paired first and second wheels, respectively;

means for generating, in succession, a timing signal indicative of a predetermined unit time period;

first and second pulse signal withdrawing means responsive to said first and second pulse signal generating means, respectively, and said timing signal generating means for withdrawing, in succession, the pulse signals from said first and second pulse signal generating means, respectively, for providing first and second velocity data signals associated with the velocity of rotations of said first and second wheels, respectively, for each of said successive predetermined unit time periods;

means responsive to the velocity data signal output from at least one of said first and second pulse signal withdrawing means for integrating the velocity data signal for evaluating in succession, the moving distance of said moving vehicle, for each of said successive predetermined unit time periods;

means responsive to said first and second pulse signal withdrawing means for providing, in succession, the difference between said first and second velocity data signals from said first and second pulse signal withdrawing means, respectively, for each of said successive predetermined unit time periods;

means responsive to said difference providing means for evaluating, in succession, a trigonometric function value associated with said difference, for each of said successive predetermined unit time periods; and means responsive to the output from said moving distance evaluating means and the output from said trigonometric function value evaluating means for multiplying, in succession, said moving distance from said moving distance evaluating means by said trigonometric function value from said trigonometric function value evaluating means for evaluating information for locating the moving position of said moving vehicle.

2. A system in accordance with claim 1, in which said first and second pulse signal withdrawing means each comprise:

first and second counting means responsive to said first and second pulse signal generating means, respectively, and said timing signal generating means for counting, in succession, the number of pulse signals from said first and second pulse signal generating means, respectively, for providing said first and second velocity data signals, for each of said successive predetermined unit time periods.

3. A system in accordance with claim 2, in which said first and second pulse signal withdrawing means each further comprise:

first and second storage means responsive to said first and second counting means, respectively, and said timing signal generating means for storing, in succession, said first and second velocity data signals from said first and second counting means, for each of the successive succeeding predetermined unit time periods.

4. A system in accordance with claim 3, which further comprises:

first and second abnormal change detecting means responsive to said first and second counting means and said first and second storage means, respectively, for detecting an abnormal change in the velocity data signals associated with the velocity of rotations of said paired first and second wheels, respectively; and first and second means responsive to said first and second abnormal change detecting means for selectively withdrawing the velocity data signals from said first and second storage means in the presence of an abnormal change detected output from said first and second abnormal change detecting means and withdrawing the velocity data signals from said first and second counting means in the absence of an abnormal change detected output from said first and second abnormal change detecting means.

5. A system in accordance with claim 4, in which said first and second abnormal change detecting means each comprises:

first and second means responsive to said first and second counting means and said first and second storage means for evaluating the difference between the first and second velocity data signals from said first and second counting means and the velocity data signals from said first and second storage means, respectively, said selective withdrawing means being adapted to be responsive to said difference output from said difference evaluating means.

6. A system in accordance with claim 1, which further comprises means for outputting said position locating information.

7. A system in accordance with claim 6, in which output means comprises means for recording said position locating information.

8. A system in accordance with claim 7 in which said recording means comprises:
   a record medium; and
   means responsive to said position locating information for recording said moving position of said vehicle on said record medium.

9. A system in accordance with claim 8, in which said record medium comprises:
   a map of a given reduced scale, said map comprising a machine readable reduced scale information, and which further comprises:
   means for reading said reduced scale information; and
   means responsive to the output from said reading means for accomodating said recording means to said reduced scale of said map.

10. A system in accordance with claim 6, in which said output means comprises means responsive to said position locating information for printing out said information in human readable characters.

11. A system in accordance with claim 6, in which said output means comprises means responsive to said position locating information for displaying said information.

12. A system in accordance with claim 1, which further comprises:
   means for providing a moving direction factor in a predetermined moving state of said moving vehicle; and
   means responsive to the output from said moving direction factor providing means for correcting the moving direction determined by said moving direction evaluating means.

13. A system in accordance with claim 1, which further comprises:
   means responsive to the output from said difference providing means for providing information concerning the heading direction of said moving direction.

14. A system for processing positional information of a moving vehicle comprising paired first and second independently rotatable wheels providing at both sides of the moving direction of the vehicle, said system comprising:
   first and second means independently and operatively coupled to said paired first and second wheels, respectively, for generating pulse signals in association with the rotations of said paired first and second wheels, respectively;
   means for generating, in succession, a timing signal indicative of a predetermined unit time period;
   first and second pulse signal withdrawing means for withdrawing, in succession, said pulse signals from said first and second pulse signal generating means, respectively, for providing first and second velocity data signals associated with the velocity of rotations of said paired first and second wheels, respectively, for each of said successive predetermined unit time periods;
   means responsive to the velocity data signal output from at least one of said first and second pulse signal withdrawing means for integrating the velocity data signal for evaluating, in succession, the moving distance of said moving vehicle, for each of said successive predetermined unit time periods;
   means responsive to said first and second pulse signal withdrawing means for providing, in succession, the difference between said first and second velocity data signals from said first and second pulse signal withdrawing means, for each of said successive predetermined unit time periods;
   means responsive to said difference providing means for evaluating, in succession, a trigonometric function value associated with said difference, for each of said successive predetermined unit time periods;
   means responsive to the output from said moving distance evaluating means and the output from said trigonometric function value evaluating means for multiplying, in succession, said moving distance from said moving distance evaluating means by said trigonometric function value from said trigonometric function value evaluating means for evaluating coordinate positional information of said moving vehicle;
   a position display medium for displaying the position of said moving vehicle;
   means operatively associated with said position display medium for scanning said position display medium;
   means operatively coupled to said scanning means for detecting the scanning position on said position display medium by said scanning means;
   means responsive to said coordinate position information evaluating means and said scanning position detecting means for comparing the output from said coordinate position information providing means and the scanning position information from said scanning position detecting means; and
   means responsive to the output from said comparing means and operatively coupled to said position display medium for displaying the position of said moving vehicle on said position display medium.

15. A system in accordance with claim 14, in which said first and second pulse signal withdrawing means each comprise:
   first and second counting means responsive to said first and second pulse signal generating means, respectively, and said timing signal generating means for counting, in succession, the number of pulse signals from said first and second pulse signal generating means, respectively, for providing said first and second velocity data signals, for each of said successive predetermined unit time periods.

16. A system in accordance with claim 15, in which said first and second pulse signal withdrawing means each further comprise:
   first and second storage means responsive to said first and second counting means, respectively, and said timing signal generating means for storing, in succession, said first and second velocity data signals from said first and second counting means, for each of the successive succeeding predetermined unit time periods.

17. A system in accordance with claim 16, which further comprises:
   first and second abnormal change detecting means responsive to said first and second counting means and said first and second storage means, respectively, for detecting an abnormal change in the velocity data signals associated with the velocity of rotations of said paired first and second wheels, respectively; and first and second means responsive to said first and second abnormal change detecting means for selectively withdrawing the velocity data signals from said first and second storage means in the presence of an abnormal change detected output from said first and second abnormal change detecting means and withdrawing the velocity data signals from said first and second counting means in the absence of an abnormal change detected output from said first and second abnormal change detecting means.

18. A system in accordance with claim 17, in which said first and second abnormal change detecting means each comprises:

first and second means responsive to said first and second counting means and said first and second storage means for evaluating the difference between the first and second velocity data signals from said first and second counting means and the velocity data signals from said first and second storage means, respectively, said selective withdrawing means being adapted to be responsive to said difference output from said difference evaluating means.

19. A system in accordance with claim 14, which further comprises a recording medium for recording the moving path of said moving vehicle, whereby the position of said moving vehicle is recorded in succession in response to the successive outputs from said compare means and the moving path of said moving vehicle is recorded.

20. A system in accordance with claim 19, in which said moving path recording medium has a desired path recorded in advance, and which further comprises:

means for scanning said desired path for withdrawing the scanning position information associated with said desired path; and means responsive to the co-ordinate position information of said moving vehicle and said scanning position information for evaluating the distance and azimuth from said co-ordinate position of said vehicle to said scanning position.

21. A system in accordance with claim 20, which further comprises:

means for generating function information associated with said desired path; and means responsive to said functional information and said co-ordinate position information of said moving vehicle for evaluating the distance and the azimuth from said co-ordinate position to said desired path.

22. A system for processing positional information of a moving vehicle comprising paired first and second independently rotatable wheels provided at both sides of the moving direction of the vehicle, said system comprising:

first and second means independently and operatively coupled to said paired first and second wheels, respectively, for generating pulse signals in association with the rotation of said paired first and second wheels, respectively;

means for generating, in succession, a timing signal indicative of a predetermined unit time period;

first and second pulse signal withdrawing means responsive to said first and second pulse signal generating means, respectively, and said timing signal generating means for withdrawing, in succession, the pulse signals from said first and second pulse signal generating means, respectively, for providing first and second velocity data signals associated with the velocity of rotations of said first and second wheels, respectively, for each of said successive predetermined unit time periods;

means responsive to the velocity data signal output from at least one of said first and second pulse signal withdrawing means for integrating the velocity data signal for evaluation in succession, the moving distance of said moving vehicle, for each of said successive predetermined unit time periods;

means responsive to said first and second pulse signal withdrawing means for providing, in succession, the difference between said first and second velocity data signals from said first and second pulse signal withdrawing means, respectively, for each of said successive predetermined unit time periods;

means responsive to said difference providing means for evaluating, in succession, a trigonometric function value associated with said difference, for each of said successive predetermined unit time periods;

means responsive to the output from said moving distance evaluating means and the output from said trigonometric function value evaluating means for multiplying, in succession, said moving distance from said moving distance evaluating means by said trigonometric function value from said trigonometric function value evaluating means for evaluating information for locating the moving position of said moving vehicle;

means fixedly provided on a predetermined point for transmitting positional information identifying said predetermined point;

means borne on said moving vehicle for receiving said positional information identifying said point transmitted from said transmitting means; and means responsive to an output from said receiving means for correcting said moving position locating information obtainable from said moving position locating information providing means.

23. A system in accordance with claim 22, in which said first and second pulse signal withdrawing means each comprise:

first and second counting means responsive to said first and second pulse signal generating means, respectively, and said timing signal generating means for counting, in succession, the number of pulse signals from said first and second pulse signal generating means, respectively, for providing said first and second velocity data signals, for each of said successive predetermined unit time periods.

24. A system in accordance with claim 23, in which said first and second pulse signal withdrawing means each further comprise:

first and second storage means responsive to said first and second counting means, respectively, and said timing signal generating means for storing, in succession, said first and second velocity data signals from said first and second counting means, for each of the successive succeeding predetermined unit time periods.

25. A system in accordance with claim 24, which further comprises:

first and second abnormal change detecting means responsive to said first and second counting means and said first and second storage means, respectively, for detecting an abnormal change in the velocity data signals associated with the velocity of rotations of said paired first and second wheels, respectively; and first and second means responsive to said first and second abnormal change detecting means for selectively withdrawing the velocity data signals from said first and second storage means in the presence of an abnormal change detected output from said first and second abnormal change detecting means and withdrawing the velocity data signals from said first and second counting means in the absence of an abnormal change detected output from said first and second abnormal change detecting means.

26. A system in accordance with claim 25, in which said first and second abnormal change detecting means each comprises:

first and second means responsive to said first and second counting means and said first and second storage means for evaluating the difference between the first and second velocity data signals from said first and second counting means and the velocity data signals from said first and second storage means, respectively, said selective withdrawing means being adapted to be responsive to said difference output from said difference evaluating means.

27. A system in accordance with claim 22, in which said transmitting means comprises a plurality of said transmitting means provided at different predetermined points; and said receiving means comprises means responsive to position locating information from said plurality of transmitting means for judging the moving direction of said moving vehicle, and which further comprises:

means responsive to an output from said moving direction judging means for forcibly changing said output from said moving direction evaluating means.

28. A system in accordance with claim 27, which further comprises means for manually providing moving directional information to said moving direction judging means.

29. A system in accordance with claim 22, which further comprises means for outputting said position locating information.

30. A system in accordance with claim 29, in which said output means comprises means for recording said position locating information.

31. A system in accordance with claim 30, in which said recording means comprises:

a record medium; and means responsive to said position locating information for recording said moving position of said vehicle on said record medium.

32. A system in accordance with claim 31, in which said record medium comprises:

a map of a given reduced scale, said map comprising a machine readable reduced scale information, and which further comprises:

means for reading said reduced scale information; and means responsive to the output from said reading means for accommodating said recording means to said reduced scale of said map.

33. A system in accordance iwth claim 29, in which said output means comprises means responsive to said position locating information for printing out said information in human readable characters.

34. A system in accordance with claim 29, in which said output means comprises means responsive to said position locating information for displaying said information.

35. A system for processing positional information of a moving vehicle comprising paired first and second independently rotatable wheels provided at both sides of the moving direction of the vehicle, said system comprising:

first and second means independently and operatively coupled to said paired first and second wheels, respectively, for generating pulse signals in association with the rotations of said paired first and second wheels, respectively;

means for generating, in succession, a timing signal indicative of a predetermined unit time period;

first and second pulse signal withdrawing means for withdrawing, in succession, said pulse signals from said first and second pulse signal generating means, respectively, for providing first and second velocity data signals associated with the velocity of rotations of said paired first and second wheels, respectively, for each of said successive predetermined unit time periods;

means responsive to the velocity data signal output from at least one of said first and second pulse signal withdrawing means for integrating the velocity data signal for evaluating, in succession, the moving distance of said moving vehicle, for each of said successive predetermined unit time periods;

means responsive to said first and second pulse signal withdrawing means for providing, in succession, the difference between said first and second velocity data signals from said first and second pulse signal withdrawing means, for each of said successive predetermined unit time periods;

means responsive to said difference providing means for evaluating, in succession, a trigonometric function value associated with said difference, for each of said successive predetermined unit time periods;

means responsive to the output from said moving distance evaluating means and the output from said trigonometric function value evaluating means for multiplying, in succession, said moving distance from said moving distance evaluating means by said trigonometric function value from said trigonometric function value evaluating means for evaluating coordinate positional information of said moving vehicle;

means for storing information concerning a moving path to be followed by said moving vehicle;

means operatively associated with said store means for scanning said information concerning said moving path for providing information associated with said moving path; and means responsive to the coordinate position information of said moving vehicle and said scanning position information for evaluating the distance and azimuth from said coordinate position of said vehicle to said scanning position.

36. A system in accordance with claim 35, in which said first and second pulse signal withdrawing means each comprise:

first and second counting means responsive to said first and second pulse signal generating means, respectively, and said timing signal generating means for counting, in succession, the number of pulse signals from said first and second pulse signal generating means, respectively, for providing said first and second velocity data signals, for each of said successive predetermined unit time periods.

37. A system in accordance with claim 36, in which said first and second pulse signal withdrawing means each further comprise:

first and second storage means responsive to said first and second counting means, respectively, and said timing signal generating means for storing, in succession, said first and second velocity data signals from said first and second counting means, for each of the successive succeeding predetermined unit time periods.

38. A system in accordance with claim 37, which further comprises:

a first and second abnormal change detecting means responsive to said first and second counting means and said first and second storage means, respectively, for detecting an abnormal change in the velocity data signals associated with the velocity of rotations of said paired first and second wheels, respectively; and first and second means responsive to said first and second abnormal change detecting means for selectively withdrawing the velocity data signals from said first and second storage means in the presence of an abnormal change detected output from said first and second abnormal change detecting means and withdrawing the velocity data signals from said first and second counting means in the absence of an abnormal change detected output from said first and second abnormal change detecting means.

39. A system in accordance with claim 38, in which said first and second abnormal change detecting means each comprises:

first and second means responsive to said first and second counting means and said first and second storage means for evaluating the difference between the first and second velocity data signals from said first and second counting means and the velocity data signals from said first and second storage means, respectively, said selective withdrawing means being adapted to be responsive to said difference output from said difference evaluating means.

40. A system in accordance with claim 35, wherein said information storing means comprises a recording medium for recording the moving path of said moving vehicle.

41. A system in accordance with claim 35, which further comprises:

means for generating function information associated with said path; and means responsive to said functional information and said coordinate position information of said moving vehicle for evaluating the distance and the azimuth from said coordinate position to said path.

42. A system for processing positional information of a moving vehicle comprising paired first and second independently rotatable wheels provided at both sides of the moving direction of the vehicle, said system comprising:

first and second means independently and operatively coupled to said paired first and second wheels, respectively, for generating pulse signals in association with the rotation of said paired first and second wheels, respectively;

means for generating, in succession, a timing signal indicative of a predetermined unit time period;

first and second pulse signal withdrawing means responsive to said first and second pulse signal generating means, respectively, and said timing signal generating means for withdrawing, in succession, the pulse signals from said first and second pulse signal generating means, respectively, for providing first and second data signals associated with the rotations of said first and second wheels, respectively, for each of said successive predetermined unit time periods;

means responsive to the data signal output from at least one of said first and second pulse signal withdrawing means for evaluating in succession, the moving distance of said moving vehicle, for each of said successive predetermined unit time periods;

means responsive to said first and second pulse signal withdrawing means for providing, in succession, the difference between said first and second data signals from said first and second pulse signal withdrawing means, respectively, for each of said successive predetermined unit time periods;

means responsive to said difference providing means for evaluating, in succession, a trigonometric function value associated with said difference, for each of said successive predeterminted unit time periods;

means responsive to the output from said moving distance evaluating means and the output from said trigonometric function value evaluating means for multiplying, in succession, said moving distance from said moving distance evaluating means by said trigonometric function value from said trigonometric function value evaluating means for evaluating information for locating the moving position of said moving vehicle;

said first and second pulse signal withdrawing means each comprising:

first and second counting means responsive to said first and second pulse signal generating means, respectively, and said timing signal generating means for counting, in succession, the number of pulse signals from said first and second pulse signal generating means, respectively, for providing said first and second data signals, for each of said successive predetermined unit time periods; and first and second pulse signal withdrawing means each further comprise:

first and second storage means responsive to said first and second counting means, respectively, and said timing signal generating means for storing, in succession, said first and second data signals from said first and second counting means, for each of the successive succeeding predetermined unit time periods;

first and second abnormal change detecting means responsive to said first and second storage means, respectively, for detecting an abnormal change in the data signals associated with the rotations of said paired first and second wheels, respectively; and first and second means responsive to said first and second abnormal change detecting means for selectively withdrawing the data signals from said first and second storage means in the presence of an abnormal change detected output from said first and second abnormal change detecting means and withdrawing the data signals from said first and second counting means in the absence of an abnormal change detected output from said first and second abnormal change detecting means.

43. A system in accordance with claim 42, in which said first and second abnormal change detecting means each comprises:
first and second means responsive to said first and second counting means and said first and second storage means for evaluating the difference between the first and second data signals from said first and second counting means and the data signals from said first and second storage means, respectively, said selective withdrawing means being adapted to be responsive to said difference output from said difference evaluating means.

44. A system for processing positional information of a moving vehicle comprising paired first and second independently rotatable wheels provided at both sides of the moving direction of the vehicle, said system comprising:
first and second means independently and operatively coupled to said paired first and second wheels, respectively, for generating pulse signals in association with the rotations of said paired first and second wheels, respectively;
means for generating, in succession, a timing signal indicative of a predetermined unit time period;
first and second pulse signal withdrawing means for withdrawing, in succession, said pulse signals from said first and second pulse signal generating means, respectively, for providing first and second data signals associated with the rotations of said paired first and second wheels, respectively, for each of said successive predetermined unit time periods;
means responsive to the data signal output from at least one of said first and second pulse signal withdrawing means for evaluating, in succession, the moving distance of said moving vehicle, for each of said successive predetermined unit time periods;
means responsive to said first and second pulse signal withdrawing means for providing, in succession, the difference between said first and second data signals from said first and second pulse signal withdrawing means, for each of said successive predetermined unit time periods;
means responsive to said difference providing means for evaluating, in succession, a trigonometric function value associated with said difference, for each of said successive predetermined unit time periods;
means responsive to the output from said moving distance evaluating means and the output from said trigonometric function value evaluating means for multiplying, in succession, said moving distance from said moving distance evaluating means by said trigonometric function value from said trigonometric function value evaluating means for evaluating coordinate positional information of said moving vehicle;
a position display medium for displaying the position of said moving vehicle;
means operatively associated with said position display medium for scanning said position display medium;
means operatively coupled to said scanning means for detecting the scanning position on said position display medium by said scanning means;
means responsive to said coordinate position information evaluating means and said scanning position detecting means for comparing the output from said coordinate position information providing means and the scanning position information from said scanning position detecting means;
means responsive to the output from said comparing means and operatively coupled to said position display medium for displaying the position of said moving vehicle on said position display medium;
said first and second pulse signal withdrawing means each comprising:
first and second counting means responsive to said first and second pulse signal generating means, respectively, and said timing signal generating means for counting, in succession, the number of pulse signals from said first and second pulse signal generating means, respectively, for providing said first and second data signals, for each of said successive predetermined unit time periods; and
first and second storage means responsive to said first and second counting means, respectively, and said timing signal generating means for storing, in succession, said first and second data signals from said first and second counting means, for each of the successive succeeding predetermined unit time periods;
first and second abnormal change detecting means responsive to said first and second counting means and said first and second storage means, respectively, for detecting an abnormal change in the data signals associated with the rotations of said paired first and second wheels, respectively; and
first and second means responsive to said first and second abnormal change detecting means for selectively withdrawing the data signals from said first and second storage means in the presence of an abnormal change detected output from said first and second abnormal change detecting means and withdrawing the data signals from said first and second counting means in the absence of an abnormal change detected output from said first and second abnormal change detecting means.

45. A system in accordance with claim 44, in which said first and second abnormal change detecting means each comprises:
first and second means responsive to said first and second counting means and said first and second storage means for evaluating the difference between the first and second data signals from said first and second counting means and the data signals from said first and second storage means, respectively, said selective withdrawing means being adapted to be responsive to said difference output from said difference evaluating means.

46. A system for processing positional information of a moving vehicle comprising paired first and second independently rotatable wheels provided at both sides of the moving direction of the vehicle, said system comprising:
first and second means independently and operatively coupled to said paired first and second wheels, respectively, for generating pulse signals in association with the rotation of said paired first and second wheels, respectively;
means for generating, in succession, a timing signal indicative of a predetermined unit time period;
first and second pulse signal withdrawing means responsive to said first and second pulse signal generating means, respectively, and said timing signal generating means for withdrawing, in succession, the pulse signals from said first and second pulse signal generating means, respectively, for providing first and second data signals associated with the rotations of said first and second wheels, respectively, for each of said successive predetermined unit time periods;

means responsive to the data signal output from at lease one of said first and second pulse signal withdrawing means for evaluating in succession, the moving distance of said moving vehicle, for each of said successive predetermined unit time periods;

means responsive to said first and second pulse signal withdrawing means for providing, in succession, the difference between said first and second data signals from said first and second pulse signal withdrawing means, respectively, for each of said successive predetermined unit time periods;

means responsive to said difference providing means for evaluating, in succession, a trigonometric function value associated with said difference, for each of said successive predetermined unit time periods;

means responsive to the output from said moving distance evaluating means and the output from said trigonometric function value evaluating means for multiplying, in succession, said moving distance from said moving distance evaluating means by said trigonometric function value from said trigonometric function value evaluating means for evaluating information for locating the moving position of said moving vehicle;

means fixedly provided on a predetermined point for transmitting positional information identifying said predetermined point;

means borne on said moving vehicle for receiving said positional information identifying said point transmitted from said transmitting means;

means responsive to an output from said receiving means for correcting said moving position locating information obtainable from said moving position locating information providing means;

said first and second pulse signal withdrawing means each comprising:

first and second counting means responsive to said first and second pulse signal generating means, respectively, and said timing signal generating means for counting, in succession, the number of pulse signals from said first and second pulse signal generating means, respectively, for providing said first and second data signals, for each of said successive predetermined unit time periods; and first and second storage means responsive to said first and second counting means, respectively, and said timing signal generating means for storing, in succession, said first and second data signals from said first and second counting means, for each of the successive succeeding predetermined unit time periods;

first and second abnormal change detecting means responsive to said first and second counting means and said first and second storage means, respectively, for detecting an abnormal change in the data signals associated with the rotations of said paired first and second wheels, respectively; and first and second means responsive to said first and second abnormal change detecting means for selectively withdrawing the data signals from said first and second storage means in the presence of an abnormal change detected output from said first and second abnormal change detecting means and withdrawing the data signals from said first and second counting means in the absence of an abnormal change detected output from said first and second abnormal change detecting means.

47. A system in accordance with claim 46, in which said first and second abnormal change detecting means each comprises:

first and second means responsive to said first and second counting means and said first and second storage means for evaluating the difference between the first and second data signals from said first and second counting means and the data signals from said first and second storage means, respectively, said selective withdrawing means being adapted to be responsive to said difference output from said difference evaluating means.

* * * * *